United States Patent
Kavanaugh et al.

(10) Patent No.: US 8,840,696 B2
(45) Date of Patent: Sep. 23, 2014

(54) ABRASIVE PARTICLES HAVING PARTICULAR SHAPES AND METHODS OF FORMING SUCH PARTICLES

(71) Applicants: Michael D. Kavanaugh, North Grafton, MA (US); Doruk O. Yener, Wilmington, MA (US); Jennifer H. Czerepinski, Framingham, MA (US)

(72) Inventors: Michael D. Kavanaugh, North Grafton, MA (US); Doruk O. Yener, Wilmington, MA (US); Jennifer H. Czerepinski, Framingham, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 13/738,913

(22) Filed: Jan. 10, 2013

(65) Prior Publication Data
US 2013/0186006 A1   Jul. 25, 2013

Related U.S. Application Data

(60) Provisional application No. 61/584,980, filed on Jan. 10, 2012.

(51) Int. Cl.
*B24D 3/02* (2006.01)
*C09C 1/68* (2006.01)
*C09K 3/14* (2006.01)

(52) U.S. Cl.
USPC .................................. 51/307; 51/297; 51/309

(58) Field of Classification Search
None
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |
| 2,049,874 A | 8/1936 | Sherk |
| 2,148,400 A | 2/1939 | Crompton, Jr. |
| 2,248,990 A | 7/1941 | Heany |
| 2,290,877 A | 7/1942 | Heany |
| 2,318,360 A | 5/1943 | Benner et al. |
| 2,563,650 A | 8/1951 | Heinemann et al. |
| 2,880,080 A | 3/1959 | Rankin et al. |
| 3,041,156 A | 6/1962 | Rowse et al. |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |

(Continued)

FOREIGN PATENT DOCUMENTS

| CA | 743715 A | 10/1966 |
|---|---|---|
| CH | 685051 AS | 3/1995 |

(Continued)

OTHER PUBLICATIONS

International Search Report and Written Opinion for PCT/US2013/021073 dated Apr. 26, 2013, 14 pages.

(Continued)

*Primary Examiner* — Kaj K Olsen
*Assistant Examiner* — Ross J Christie
(74) *Attorney, Agent, or Firm* — Mike W. Crosby; Abel Law Group, LLP

(57) ABSTRACT

A method of forming an abrasive article includes depositing a mixture into an opening of a substrate, contacting an exposed surface of the mixture in the opening to a texturing form to form a textured preform, and removing the mixture from the opening and forming an abrasive particle having a textured surface.

20 Claims, 9 Drawing Sheets

(56) References Cited

U.S. PATENT DOCUMENTS

| | | |
|---|---|---|
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,308 A | 10/1971 | Amero |
| 3,619,151 A | 11/1971 | Sheets, Jr. et al. |
| 3,637,360 A | 1/1972 | Ueltz et al. |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,876,226 A | 10/1989 | Fuentes |
| 4,881,951 A | 11/1989 | Monroe et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |

(56) References Cited

U.S. PATENT DOCUMENTS

| | | |
|---|---|---|
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,843,815 B1 | 1/2005 | Thurber et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,919,122 B2 * | 7/2005 | Keese et al. .................. 428/167 |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,278,350 B2 * | 10/2007 | Keese et al. ..................... 99/386 |
| 7,297,402 B2 | 11/2007 | Evans et al. |
| 7,364,788 B2 | 4/2008 | Kishbaugh et al. |
| 7,373,887 B2 | 5/2008 | Jackson |
| 7,448,432 B2 * | 11/2008 | Barker et al. .................. 164/481 |
| 7,487,578 B2 * | 2/2009 | Keese et al. ..................... 29/460 |
| 7,488,544 B2 | 2/2009 | Schofalvi et al. |
| 7,507,268 B2 | 3/2009 | Rosenflanz |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |

(56) References Cited

U.S. PATENT DOCUMENTS

| | | |
|---|---|---|
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,851,045 B2 * | 12/2010 | Gandon et al. ............... 428/141 |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,256,091 B2 | 9/2012 | Duescher |
| 8,480,772 B2 | 7/2013 | Welygan et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0109986 A1 * | 6/2004 | Keese et al. ............... 428/167 |
| 2004/0148967 A1 | 8/2004 | Celikkaya et al. |
| 2004/0154473 A1 * | 8/2004 | Keese et al. ............... 99/386 |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0185256 A1 | 8/2006 | Nevoret et al. |
| 2007/0020457 A1 | 1/2007 | Adefris |
| 2007/0031602 A1 * | 2/2007 | Keese et al. ............... 427/331 |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0193714 A1 * | 8/2007 | Barker et al. ............... 164/481 |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2008/0305311 A1 * | 12/2008 | Watts et al. ............... 428/195.1 |
| 2009/0016916 A1 | 1/2009 | Rosenzweig et al. |
| 2009/0017736 A1 | 1/2009 | Block et al. |
| 2009/0114101 A1 * | 5/2009 | Keese et al. ............... 99/386 |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 * | 6/2011 | Welygan et al. ............... 101/129 |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0283705 A1 | 10/2013 | Fischer et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |

FOREIGN PATENT DOCUMENTS

| | | |
|---|---|---|
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0833803 | 8/2001 |
| EP | 1371451 A1 | 12/2003 |
| EP | 1383631 B1 | 1/2004 |
| EP | 1015181 B1 | 3/2004 |
| EP | 1492845 A1 | 1/2005 |

(56) References Cited

FOREIGN PATENT DOCUMENTS

| | | |
|---|---|---|
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2567784 A1 | 3/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10-235553 A | 9/1998 |
| JP | 10330734 A | 12/1998 |
| JP | H10315142 | 12/1998 |
| JP | 2957492 B2 | 10/1999 |
| JP | 2000091280 A | 3/2000 |
| JP | 3160084 B2 | 4/2001 |
| JP | 03194269 B2 | 7/2001 |
| JP | 2001207160 A | 7/2001 |
| JP | 2002-038131 A | 2/2002 |
| JP | 73007750 B1 | 8/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2006/027593 | 3/2006 |
| WO | 2007/041538 A1 | 4/2007 |
| WO | 2009/085578 A2 | 7/2009 |
| WO | 2010/077509 A1 | 7/2010 |
| WO | 2010/085587 A1 | 7/2010 |
| WO | 2010077509 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013151745 A1 | 10/2013 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |

OTHER PUBLICATIONS

"Investigation of Shaped Abrasive Particles vol. 1: Review of US Pat No. 6,054,093 Apr. 25, 2000" © Apr. 2011, 5 pages.
Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

\* cited by examiner

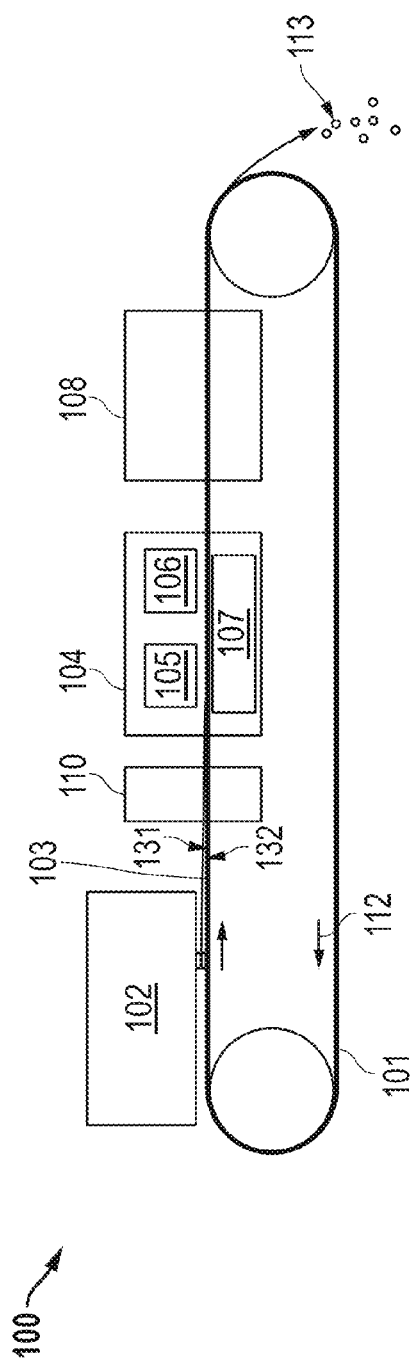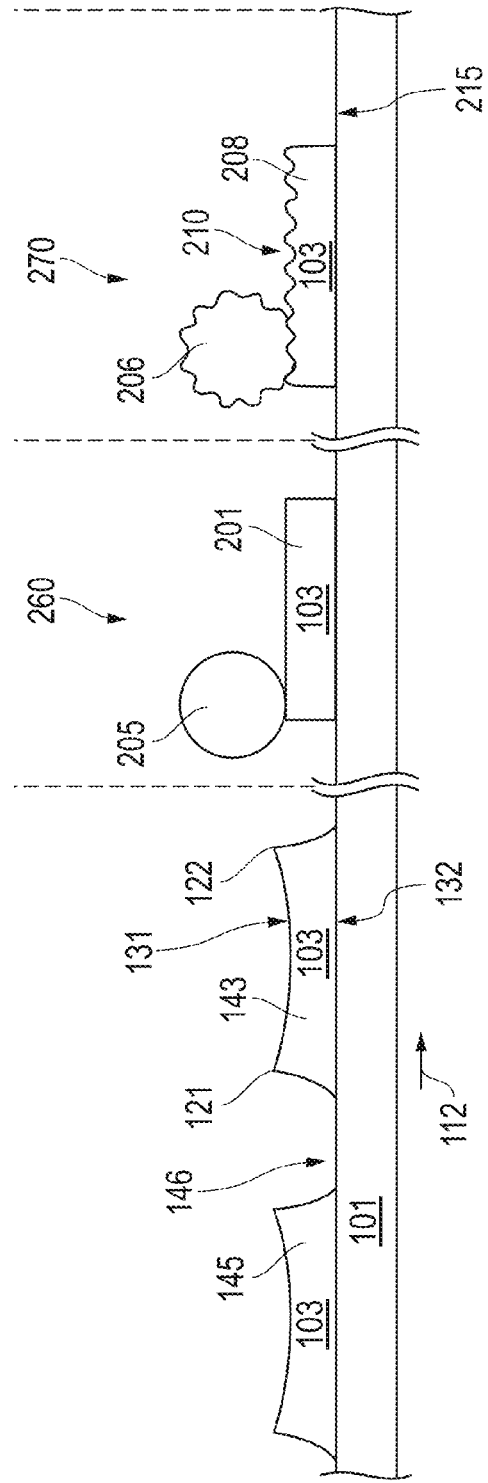
FIG. 1
FIG. 2

US 8,840,696 B2

ABRASIVE PARTICLES HAVING PARTICULAR SHAPES AND METHODS OF FORMING SUCH PARTICLES

CROSS-REFERENCE TO RELATED APPLICATION(S)

The present application claims priority from U.S. Provisional Patent Application No. 61/584,980, filed Jan. 10, 2012, entitled "ABRASIVE PARTICLES HAVING PARTICULAR SHAPES AND METHODS OF FORMING SUCH PARTICLES" naming inventor Michael D. Kavanaugh et al., which application is incorporated by reference herein in its entirety.

BACKGROUND

1. Field of the Disclosure

The following is directed to abrasive articles, and particularly, methods of forming abrasive particles.

2. Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, which discloses a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of up to 10 micrometers in diameter. Binders can be added to the powders along with a lubricant and a suitable solvent, e.g., water. The resulting mixtures, pastes, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size.

Chemical ceramic technology involves converting a colloidal dispersion or hydrosol (sometimes called a sol), optionally in a mixture, with solutions of other metal oxide precursors, to a gel or any other physical state that restrains the mobility of the components, drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to a first aspect, a method of forming an abrasive article includes providing a paste on a substrate, texturing a first major surface and a second major surface opposite the first major surface of the paste to form a textured preform, and treating the textured preform to form an abrasive particle having a first major surface comprising a first texture and a second major surface comprising a second texture. Providing can include forming the mixture using a process selected from the group consisting of casting, tape casting, printing, molding, extruding, sectioning, pressing, and a combination thereof.

In another aspect, a method of forming an abrasive article includes depositing a paste comprising an abrasive precursor onto a substrate into a plurality of discrete preform sections separated from each other on the substrate, texturing a first major surface of each of the plurality of discrete preform sections to form a plurality of textured preforms, and treating each of the plurality of textured preforms to form abrasive particles having textured surfaces.

In still another aspect, an abrasive article includes an abrasive particle comprising a body having a first surface, the first surface comprising a liquid management texture.

According to an aspect, an abrasive article includes an abrasive particle comprising a body having a first surface and a second surface opposite the first surface, wherein the first surface comprises a first texture and the second surface comprises a second texture.

In still another aspect, an abrasive article includes an abrasive particle having a body including a first surface defining an upper face, and a second surface opposite the first surface defining a bottom face, wherein the upper face comprises a grinding texture and the bottom face comprises an orientation texture configured to preferentially orient the body in an upright position presenting the upper face in a position for contact with a workpiece.

According to another aspect, a method of forming an abrasive article includes depositing a mixture into an opening of a substrate, contacting an exposed surface of the mixture in the opening to a texturing form to form a textured preform, and removing the mixture from the opening and forming an abrasive particle having a textured surface.

In yet another aspect, an abrasive article includes an abrasive particle including a body having a first surface and a second surface opposite the first surface, wherein the first surface has a first texture and the second surface has a second texture, wherein the first texture is selected from the group consisting of a pebbled surface feature and a recessed-protrusion surface feature.

In yet another aspect, an abrasive article includes an abrasive particle comprising a body having a first surface and a second surface opposite the first surface, wherein the first surface comprises a first texture and the second surface comprises a second texture, wherein the first texture is selected from the group consisting of a pebbled surface feature and a recessed-protrusion surface feature.

According to another aspect, an abrasive article includes an abrasive particle having a body comprising, a first surface defining an upper face, and a second surface opposite the first surface defining a bottom face, wherein the upper face comprises a grinding texture and the bottom face comprises an orientation texture configured to preferentially orient the body in an upright position presenting the upper face in a position for contact with a workpiece.

In yet another aspect, a method of forming an abrasive article includes providing a mixture on a substrate, texturing a first major surface and a second major surface opposite the first major surface of the mixture to form a textured preform, and treating the textured preform to form an abrasive particle having a first major surface comprising a first texture and a second major surface comprising a second texture.

For yet another aspect, a method of forming an abrasive article includes depositing a mixture into an opening of a substrate, contacting an exposed surface of the mixture in the opening to a texturing form to form a textured preform, and removing the mixture from the opening and forming an abrasive particle having a textured surface.

BRIEF DESCRIPTION OF THE DRAWINGS

The present disclosure may be better understood, and its numerous features and advantages made apparent to those skilled in the art by referencing the accompanying drawings.

FIG. 1 includes an illustration of a process for forming an abrasive article in accordance with an embodiment.

FIG. 2 includes an illustration of processing to form an abrasive article in accordance with an embodiment.

The use of the same reference symbols in different drawings indicates similar or identical items.

DETAILED DESCRIPTION

Figure 3:
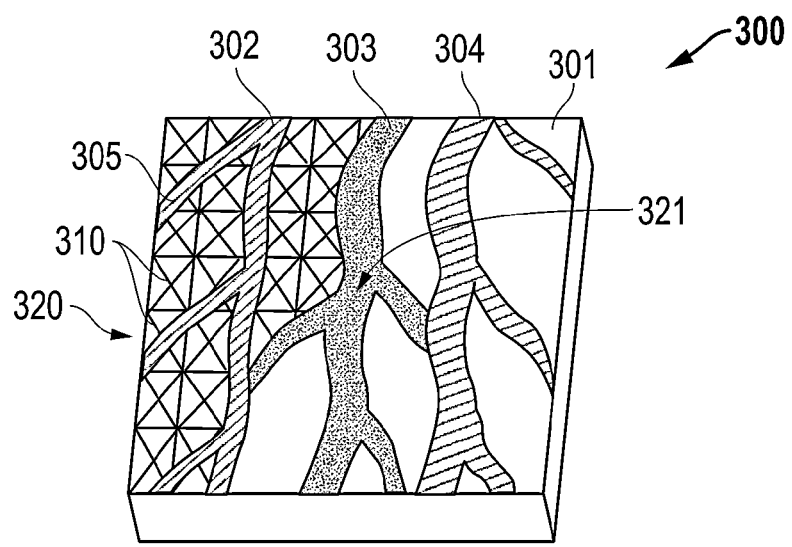
FIG. 3 includes an illustration of an abrasive particle in accordance with an embodiment.

The following is directed to abrasive articles and methods of forming abrasive articles. In particular, the following includes methods of forming abrasive particles having particular features for use in various abrasive articles. For example, the abrasive particles of the embodiments herein may be suitable for use in coated abrasive articles, bonded abrasive articles and the like.

FIG. 1 includes an illustration of a process for forming an abrasive article in accordance with an embodiment. As illustrated, the process of forming an abrasive article can include providing a paste 103 on a surface of a substrate 101. The term paste and mixture are used interchangeably herein. Notably, the substrate 101 can be translated between spools such that its acts as a conveyor belt configured to translate the paste 103 through processing stations, which facilitates the formation of the abrasive particles. In accordance with an embodiment, the substrate 101 can be translated relative to a deposition region 102 where the paste 103 is placed on the surface of the substrate 101.

In certain instances, the paste 103 can be a slurry, mixture, or gel. For example, the paste 103 can include a mixture of solid particles suspended in a liquid vehicle. In more particular embodiments, the paste 103 can be a sol gel including particulate matter mixed with a liquid vehicle, wherein the sol gel slurry comprises certain rheological characteristics, such that it is in the form of a dimensionally stable mixture.

The paste 103 can be deposited on the substrate 101 in various manners. For example, deposition of the paste 103 on the substrate 101 can include a deposition process, more particularly a printing process. For example, the paste 103 can be deposited through an aperture and onto the substrate 101 in the manner of a screen printing process. See, for example, U.S. Pat. No. 6,054,093, which is incorporated in its entirety herein.

In particular, the screen printing process can utilize a printing screen in the form of a continuous printing belt that can pass around a series of rolls, with the space between certain rolls defining zones within the printing process. For example, the screen printing process can utilize an application zone, a disengagement zone, a cleaning zone, and a treatment zone. In the application zone, the screen can be held in firm contact with the substrate 101 while both the screen (i.e., printing belt) and the substrate 101 move in the same direction at essentially the same speed and a dispersion of abrasive precursor particles is applied to the inside surface of the screen, ahead of a doctor blade. The passage beneath the doctor blade forces the paste into the apertures in the screen printing belt, which at that point, is in firm contact with the substrate 101.

In the disengagement zone, the screen printing belt is disengaged from the substrate 101 leaving the screen printed shapes on the surface of the substrate 101. The shapes can be transported by the substrate 101 to further processing zones, including for example, a drying zone, where moisture is withdrawn from the shapes at least to the extent necessary to convert them to particles which retain their structural integrity upon handling. Before the substrate 101 enters the application zone in contact with the screen printing belt, it may be given a release treatment, (such a fluorocarbon spray), if the substrate 101 has not been pre-treated to give it a baked-on release layer.

Meanwhile the screen printing belt, after leaving the disengagement zone, can pass through the cleaning section in which the screen printing belt can be cleaned and readied for use again. The cleaning process can include drying, directed brushes, air blasts, and combinations of such processes.

From the cleaning zone, the screen printing belt can pass to the treatment zone, in which a release agent may, if desired, be applied to ease the separation of the shapes from the screen printing belt in the disengagement zone.

The paste 103 can include an abrasive precursor material. An abrasive precursor material may be a material that can be formed into an abrasive particulate material through further processing, which may include for example, a process such as calcining. In accordance with an embodiment, the paste 103 can include an abrasive precursor that includes material such as oxides, borides, nitrides, carbides, oxynitrides, oxyborides, hydroxides, precipitated salts of nitrates, chlorides, sulphates, and a combination thereof. In particular instances, the abrasive precursor can include an alumina-based material, such as boehmite.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

The paste 103 can be formed to have a particular content of solid materials, including for example, a certain content of abrasive precursor material. For example, the paste 103 can be formed such that it includes at least about 5 wt % solids for the total weight of the paste. In other instances, the amount of solids within the paste can be greater, such as at least about 8%, at least about 10 wt %, at least about 12 wt %, at least about 15 wt %, at least about 18 wt %, at least about 20 wt %, at least about 25 wt %, at least about 30 wt %, at least about 35 wt %, at least about 40 wt %, at least about 50 wt %, or even at least about 55 wt %. Still, in particular instances, the solid content of the paste 103 can be not greater than about 90 wt %, such as not greater than about 85 wt %, not greater than about 75 wt %, not greater than about 70 wt %, not greater than about 65 wt %, not greater than about 55 wt %, or even not greater than about 50 wt %. It will be appreciated that the paste can contain a solids content within a range between any of the minimum and maximum percentages noted above.

Moreover, the content of abrasive precursor material that makes up the total solid content of the abrasive paste can be controlled. For example, the solids content of the paste can be at least about 50 wt % abrasive precursor material for the weight of the solids within the paste 103. In other instances, the amount of abrasive precursor material for the total amount of solid material within the paste can be greater, such as at least about 55 wt %, at least about 60 wt %, at least about 70 wt %, at least about 80 wt %, at least about 85 wt %, at least about 90 wt %, at least about 95 wt %, or even at least about 97 wt % of the total weight of the solids within the paste. In one particular paste, essentially the entire weight of solid material is abrasive precursor material.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $1 \times 10^6$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the get into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported. The viscosity can be calculated by dividing the storage modulus value by 6.28 s−1.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or even at least about $65 \times 10^3$ Pa s. In at least one non-limiting embodiment, the mixture 101 may have a viscosity of not greater than about $1 \times 10^6$ Pa s, not greater than about $5 \times 10^5$ Pa s, not greater than about $3 \times 10^5$ Pa s, or even not greater than about $2 \times 10^5$ Pa s. It will be appreciated that the viscosity of the mixture 101 can be within a range between any of the minimum and maximum values noted above.

In accordance with another embodiment the paste 103 can include a certain content of abrasive grains. Abrasive grains are distinct from abrasive precursor material, as abrasive grains represent the finally-formed phase of abrasive grains. For certain slurries, the abrasive grains may be present as a seed material, which may facilitate a phase change of abrasive precursor material also included within the paste 103 during later processing.

The paste can contain an amount of abrasive grains in a minor amount, including for example, less than about 20 wt %, less than about 10 wt %, or even less than about 5 wt %. However, particular slurries can be formed such that they contain a greater content of abrasive grains. For example, a paste can contain a majority content of abrasive grains. Notably, the paste can contain a content of abrasive grains that is the same as the content of abrasive precursor material for the total weight of solids within the paste as noted above.

The abrasive grains can include a material such as an oxide, boride, nitride, carbide, oxynitride, oxyboride, and a combination thereof. Certain abrasive grains include alumina, silicon carbide, alumina/zirconia and CBN. In more particular instances, the paste can include abrasive grains that are made of alumina, and more particularly, may consist essentially of alumina. In one instance, the abrasive grains consist essentially of alpha alumina. It is to be understood however that the invention is not so limited but is capable of being adapted for use with a plurality of different precursor materials.

The paste may contain a certain content of solid material, liquid material, and additives such that it has suitable rheological characteristics for use with the process detailed herein. That is, in certain instances, the paste 103 can have a certain viscosity, and more particularly suitable rheological characteristics that form a dimensionally stable phase of material that can be formed through the process as noted herein.

As illustrated, the substrate 101 can be translated in a direction 112 such that paste 103 can be deposited on the substrate 101 within a deposition region 102. Notably, the process of providing the paste 103 within the deposition region 102 can include the formation of a film or layer of paste 103 on the substrate 101. In particular, the paste 103 is in the form of a layer having a first major surface 131 defined as an upper surface away from the surface of the substrate 101. Furthermore, the paste 103 can be deposited in a manner such that it has a second major surface 132 opposite the first major surface 131, wherein the second major surface 132 can be considered a bottom surface that can be in direct contact with the surface of the substrate 101. While the paste 103 is illustrated as being a continuous layer according to the process of FIG. 1, it will be appreciated that the paste 103 can be deposited in alternative manners, some of which are described herein.

The paste 103 can be translated to a region 104. In accordance with an embodiment, the paste 103 can undergo a texturing process, wherein at least the first major surface 131 of the paste 103 is processed such that features are formed on the first major surface 131. In particular instances, texturing can include forming a patterned surface in the first major surface 131 defined by a regular and repeating array of features on at least the first major surface 131 of the paste 103. The regular and repeating array of features can include a regular arrangement of features that can have the same shape and position relative to each other. Moreover, the regular and repeating array of features can include a mix of features (e.g., protrusions and grooves) that are arranged in a repetitive pattern.

In other instances, the texturing processing can include forming features of the first major surface 131 and an irregular arrangement, such that the first major surface 131 is defined by a random arrangement of features, which can have an irregular shape and irregular placement on the first major surface 131.

In particular instances, texturing includes the formation of a plurality of features on the first major surface 131, which can include features such as grooves, protrusions, and a combination thereof. In accordance with an embodiment, the features can have polygonal two-dimensional shapes as viewed from the top down. Moreover, the features formed through the texturing process at region 104 can have three-dimensional contours, which may be in the form of polygons. Alternatively, the features can have irregular shapes, which can include shapes having a combination of curvilinear surfaces and linear surfaces.

According to one embodiment, the process of texturing can include the formation of features having an average feature size of not greater than about 1000 microns, which is a measure of the longest dimension of the feature as viewed from the top down. It will be appreciated that the average feature size is an average value based upon measurements of multiple, and random samples across the surface. In other embodiments, the average feature size can be less, such as not greater than about 900 microns, not greater than about 800 microns, not greater than about 700 microns, not greater than about 600 microns, not greater than about 500 microns, not greater than about 400 microns, not greater than about 300 microns, or even not greater than about 200 microns. Still, it will be appreciated that the average feature size can be at least about 1 micron, such as at least about 3 microns, at least about 5 microns, or even at least about 10 microns. It will be appreciated that the average feature size can be within a range between any of the minimum and maximum values noted above.

In accordance with an embodiment, the process of texturing can include processes such as embossing, etching, thermal treatment, radiation treatment, chemical treatment, sonic treatment, magnetic treatment, molding, pressing, punching, and a combination thereof. In particular instances, the paste 103 can be textured by contacting a first texturing form 105 to the first major surface 131 of the paste 103. Texturing using the first texturing form 105 can include processes such as rolling, stamping, punching, swiping, bladeing, (i.e., use of a doctor blade, etc.) and a combination thereof. In particular instances, the processes of texturing includes rolling the first texturing form 105, which has a first textured contour, onto the first major surface 131 of the paste 103 such that the first textured contour of the first texturing form 105 is formed into the first major surface 131. Notably, such a process may be similar to an embossing process. As such, in accordance with an embodiment, contacting of the first texturing form 105 having the first textured contour with the first major surface 131 of the paste 103 can include rolling of the texturing form 105 over the first major surface 131 thus giving the first major surface 131 a substantially similar textured contour as is provided on the texturing form 105. It will be appreciated that such a texturing process can result in the formation of a paste 103 having a first major surface 131 representing the inverse image of the first textured contour of the texturing form 105.

In certain embodiments, the texturing form 105 can be moved relative to the first major surface 131 of the paste 103 such that during the process of forming the features formed in the first major surface 131 can be controlled. More particularly, the texturing process can include articulation of the texturing form relative to the plane of the first major surface 131 of the paste 103. For example, during texturing, the texturing form 105 can be angled, tilted, twisted, and a combination thereof. Such articulating movements of the texturing form 105 during texturing can facilitate the formation of features having various, shapes, sizes, positions, and a combination thereof.

The process of texturing can include multiple processes to form features in the first major surface 131 of the paste 103. For example, in addition to texturing the first major surface 131 using texturing form 105, the first major surface 131 can further be textured using an additional process after texturing at texturing form 105. In accordance with an embodiment, suitable texturing operations can include embossing, etching, thermal treatment, radiation treatment, chemical treatment, sonic treatment, magnetic treatment, molding, pressing, punching, and a combination thereof.

In one particular process, the first major surface 131 can be further textured using another texturing form at 106. It will be appreciated that the texturing form 106 can have the same texture contour or a different texture contour as compared to the texturing form 105. In particular instances, the texturing form 106 can have a different texture contour as compared to the texturing form 105 such that it aides layering of pattern features within the first major surface 131 of the paste 103. For example, the first major surface 131 may first be textured using the texturing form 105 having one particular type of texture contour, and during translation of the paste 103 through the texturing form 106, the texturing form 106 may have a different texturing contour to facilitate the formation of additional features within the major surface 131 of the paste 103.

In addition to the texturing of the first major surface 131, in a particular embodiment, the second major surface 132 can be textured. The texture formed in the second major surface 132 can have the same features as noted above with regard to textures of the first major surface 131. The texturing of the second major surface 132 of the paste 103 can include the formation of the same type of features as noted above with regard to texturing of the first major surface 131. Alternatively, the second major surface 132 can be textured in a manner such that the features formed in the second major surface 132 are different than the features formed in the first major surface 131.

Texturing of the second major surface 132 can be completed during translation through region 104. Notably, the process of texturing the second major surface 132 of the paste 103 can include those processes as noted above for texturing of the first major surface 131. Still, in a particular instance, the process of texturing the second major surface 132 of the paste 103 can include a different process than used in texturing of the first major surface 131. In accordance with one embodiment, texturing of the second major surface 132 can include a molding process. For example, in one embodiment, the substrate 101 is provided with a textured or pattern surface. As such, upon deposition of the paste 103 onto the patterned surface of the substrate 101 the second major surface 132 of the paste 103 can conform to the pattern formed in the substrate surface. As such, the second major surface 132 of the paste 103 is textured via molding utilizing the textured surface of the substrate 101.

In accordance with another embodiment, texturing of the second major surface 132 can include contacting the second major surface 132 of the paste 103 with a texturing form 107. In accordance with an embodiment, the process of contacting the second major surface 132 to form textured features can include processes such as rolling, stamping, punching, swiping, bladeing, and a combination thereof. Notably, the texturing form 107 may contact the second major surface 132 directly. For example, the paste 103 can be formed with such rheological characteristics, that it can be rolled over a form protruding through the substrate 101 such that the form directly contacts and textures the second major surface 132 as it is translated over the texturing form 107.

In yet another embodiment, the texturing form 107 can texture the second major surface 132 by contacting the back side of the substrate 101 with sufficient force to form features in the second major surface 132 of the paste 103. In accordance with a particular embodiment, the texturing form 107 can have a textured contour, and the texturing form 107 can be rolled over the second major surface 132 to impart the textured form to the second major surface 132 of the paste 103. As such, the second major surface 132 of the paste 103 can be formed to have the inverse form of the textured contour provided on the surface of the texturing form 107.

It will be appreciated, that while the process 100 is illustrated as including a single texturing form 107 to form the surface 132 of the paste 103, multiple texturing processes can be undertaken to provide a suitable texture on the surface 132 of the paste 103. That is, multiple texturing forms can be used, each with a different texturing contour, to layer in different textures onto the second major surface 132.

Furthermore, texturing of the first major surface 131 and second major surface 132 of the paste may be conducted at the same time (i.e., simultaneously). That is, texturing of the first major surface 131 may be conducted at the same time as texturing of the second major surface 132 of the paste 103. However, in other instances, the texturing process may be undertaken such that only one of the first major surface 131 and the second major surface 132 are textured at a time, and as such, the texturing process for the first major surface 131 and second surface 132 may not be necessarily conducted simultaneously.

The foregoing has noted texturing processes utilized on the major surfaces of the paste, such that a finally-formed abrasive particle can have textured surfaces, and particularly textured major surfaces. However, it will be appreciated that certain processes, such as the texturing processes noted above, can be undertaken on the paste, such that the side surfaces of the paste, and thus the side surfaces of the abrasive particles formed from the paste, can have textured features.

Upon texturing of the paste 103 a textured preform is made from the paste 103 on the substrate 101. In accordance with an embodiment, the process 100 of forming the abrasive article can continue by treating the textured preform to form an abrasive particle. Notably, the abrasive particles can be formed from the paste 103. More particularly, the abrasive particles formed from the textured preform can have a first major surface and a second major surface, wherein each of the first major surface and second major surfaces of the abrasive particles have the texture imparted to the textured preform during processing.

In accordance with an embodiment, the process of treating the textured preform can include processes such as drying, heating, curing, reacting, radiating, mixing, stifling, agitating, planarizing, calcining, sintering, comminuting, sieving, and a combination thereof. In one particular instance, the treating process can include a process that changes the rheology of the paste 103. The process of changing the rheology of the paste can facilitate the formation of a dimensionally stable phase of material such that the texture formed in the paste is maintained and part of the finally-formed abrasive particles. As illustrated, the process of treating at region 108 can be conducted after the texturing process at region 104. However, in other embodiments the process of treating can be conducted simultaneously with the process of texturing.

Certain processes, such as drying, heating, curing, calcining, and sintering, may be conducted to remove liquid materials from the paste and solidify and stiffen the texture preform, such that the textured features are maintained. Furthermore, a process of comminuting (i.e., crushing) may also be undertaken to facilitate the formation of the finally-formed abrasive particles 113.

Calcining may be particularly suitable for sol gel slurries comprising abrasive precursor materials, such that the abrasive precursor materials may be converted to suitable phases of abrasive grains. For example, after sufficiently forming a textured preform, the textured preform can be fired at a temperature of at least about 500° C. to transform the abrasive precursor material to a high temperature phase of material, such as an abrasive grain including a transition phase alumina or alpha phase alumina. In particular instances, the calcining temperature can be at least about 600° C., at least about 700° C., at least about 800° C., at least about 900° C., or even at least about 1000° C.

Additionally, as illustrated in the process 100, forming the abrasive particles can include a pretreating process at region 110. The process of pretreating may be undertaken before the texturing process. Such a pretreating process can be conducted to control the rheology of the paste 103 and ready it for the texturing process. The pretreating process can include processes such as drying, heating, curing, reacting, radiating, mixing, stirring, agitating, planarizing, and a combination thereof. Notably, the pretreating process at region 110 can be conducted to control the rheology of the paste 103 and form a dimensionally stable phase of material that is suitable for the texturing process, and can hold a texture placed in the paste 103.

For example, in one embodiment, a pretreating process can include rolling of the major surface 131 of the paste 103 to make it ready for texturing. The pretreating process can include rolling to planarize the major surface 131 of the paste 103.

According to an alternative embodiment, the process of texturing can also include a process of radiation treatment that can include directing a focused beam of radiation at the first major surface 131 and/or the second major surface 132 of the paste 103 to form a textured surface. In fact, in certain instances a plurality of focused beams of radiation, all of which may be pre-programmed to follow a specific pattern may be utilized to etch an array of features in the first major surface 131 and/or the second major surface 132 of the paste 103. Utilization of one or more focus beams of radiation may facilitate the formation of microscopic features in the first and second major surfaces 131 and 132, respectively.

FIG. 2 includes a portion of a process of forming an abrasive article in accordance with an embodiment. In alternative embodiments, the paste may be placed on the substrate 101 in a plurality of discrete preform sections 143 and 145 that are separated from each other on the surface of the substrate 101. As illustrated, the plurality of discrete preform sections 143 and 145 can be spaced apart from each other such that a gap 146 exists between the discrete preform sections 143 and 145. As such, formation of the discrete preform sections 143 and 145 can include a particular deposition process, such that the paste 103 is placed on the substrate 101 in the form of discrete droplets.

As illustrated, the discrete preform sections 143 and 145 can take a certain shape. The shape of the discrete preform section 143 is illustrated as having corners 121 and 122 which may not be necessarily suitable for conducting texturing processes, and in fact, may hinder texturing processes. As such, a pretreating process may be undertaken at region 260. In one embodiment, the discrete preform section 143 may be pretreated to remove the corners 121 and 122 and form a pretreated discrete preform section 201. In a particular embodiment, the pre-treating process to remove the corners 121 and 122 can be a mechanical process, including rolling of the discrete preform section 143. As such, the discrete preform section 143 can be moved under a roller 205 or other mechanical device (e.g., blade) that facilitates removal of the corners 121 and 122 for further processing, such as texturing.

After pretreating in region 260, the pre-treated discrete preform section 201 can be moved into region 270 representing a texturing process. As illustrated, the texturing process can include movement of a texturing form 206 relative to the pre-treated discrete preform section 201 to form a textured preform section 208. The textured preform section 208 can have a textured surface 210 as illustrated. In particular, the texturing form 206 can be rolled over the paste 103 defining the pre-treated discrete preform section and impart the texture present on the texturing form 206 to the discrete preform to form a textured discrete preform 208. As will be appreciated, and as described herein, such a process can be conducted on the rear major surface of the discrete preforms of abrasive paste 103 as well as the major surface.

Notably, the discrete preforms 143 and 145 are formed such that they can comprise a dimensionally stable phase of material. That is, the paste 103 comprising the discrete preform sections 143 and 145 is provided with a suitable rheology to form discrete preform sections on the surface of the substrate 101 that facilitate further processing. As such, the paste can have a particular content of liquid carrier, binder, plasticizer, stabilizer, fillers, surfactants, and the like to facilitate the formation of the discrete preform sections 143 and 145.

As will be appreciated, the discrete preform sections can undergo further treatment as described in any of the embodiments above. Furthermore, the process of FIG. 2 can also include, while not illustrated, additional pre-treatment processes (in addition to the rolling as illustrated) as described in accordance with any of the embodiments herein.

Figure 8:
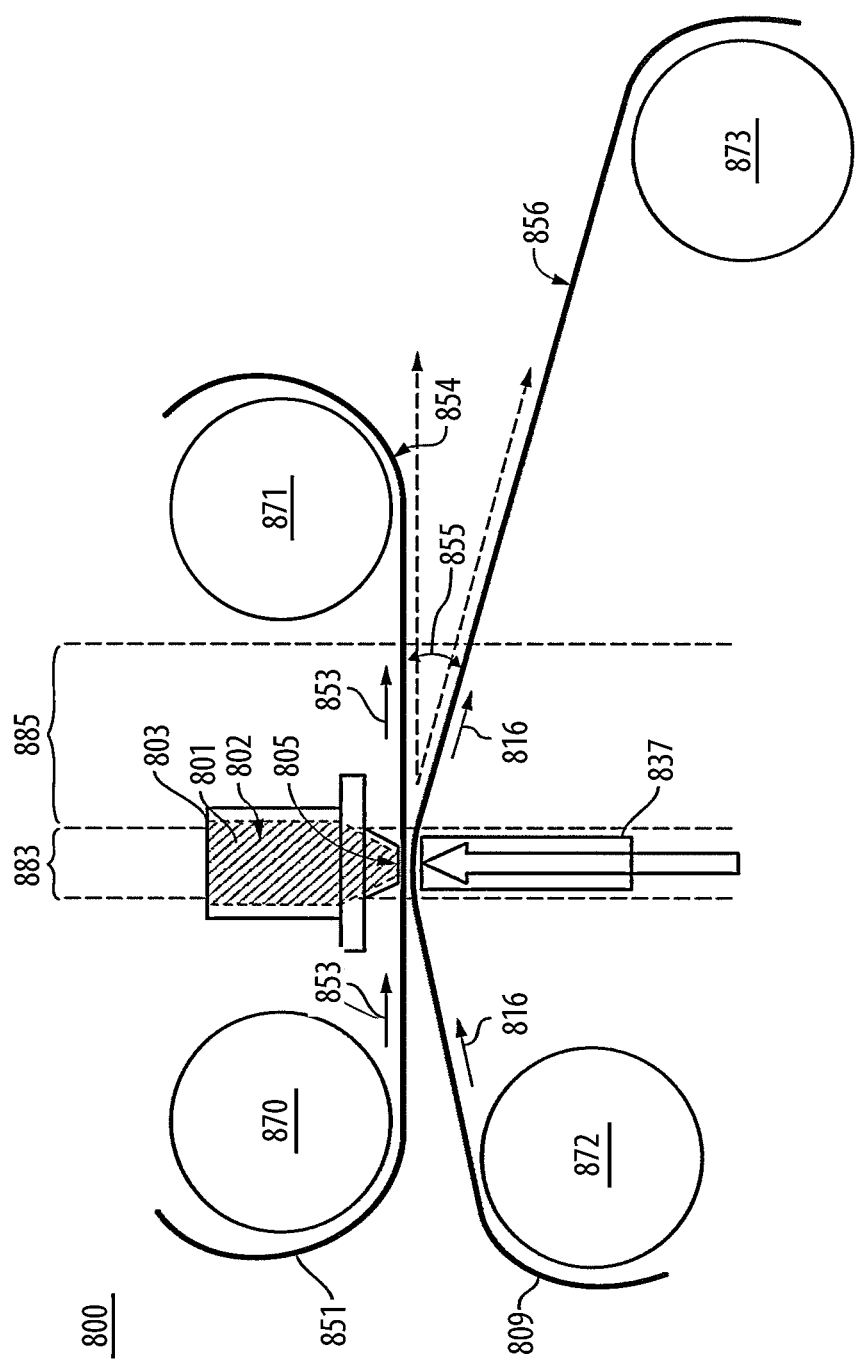
FIG. 8 includes a system for forming a shaped abrasive particle in accordance with an embodiment.

FIG. 8 includes a system for forming a shaped abrasive particle in accordance with an embodiment. As illustrated, the system 800 can include a substrate, or more particularly, a screen 851, configured to be translated between rollers 870 and 871. It will be appreciated that the screen 851 can be translated over a greater number of rollers or other devices if so desired. As illustrated, the system 800 can include a belt 809 configured to be translated in a direction 816 over rollers 872 and 873. It will be appreciated that the belt 809 may be translated over a greater number of rollers or other devices if so desired.

As illustrated, the system 800 can further include a die 803 configured to conduct extrusion of a mixture 801 through a die opening 805 positioned at one end of the die 803. As further illustrated, extruding can include applying a force 880 (or a pressure) on the mixture 801 to facilitate extruding the mixture 801 through the die opening 805. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 801 can be within a range between any of the minimum and maximum values noted above.

In particular instances, the mixture 801 can be extruded through a die opening 805 at the end of the die 803 proximate to the screen 851. In accordance with an embodiment, the screen 851 may be translated in a direction 853 at a particular rate to facilitate suitable processing. The screen 851 may be translated through the application zone at a rate of at least about 3 cm/s. In other embodiments, the rate of translation of the screen 851 may be greater, such as at least about 4 cm/s, at least about 6 cm/s, at least about 8 cm/s, or even at least about 10 cm/s. Still, in at least one non-limiting embodiment, the screen 851 may be translated in a direction 853 at a rate of not greater than about 5 m/s, such as not greater than about 1 m/s, or even not greater than about 0.5 m/s. It will be appreciated that the screen 851 may be translated at a rate within a range between any of the minimum and maximum values noted above.

Additionally, the belt 809 can be translated in a direction 816 at a particular rate to facilitate suitable processing. For example, the belt 809 can be translated at a rate of at least about 3 cm/s. In other embodiments, the rate of translation of the belt 809 may be greater, such as at least about 4 cm/s, at least about 6 cm/s, at least about 8 cm/s, or even at least about 10 cm/s. Still, in at least one non-limiting embodiment, the belt 809 may be translated in a direction 816 at a rate of not greater than about 5 m/s, such as not greater than about 1 m/s, or even not greater than about 0.5 m/s. It will be appreciated that the belt 809 may be translated at a rate within a range between any of the minimum and maximum values noted above. In accordance with a particular embodiment, the screen 851 may be translated at a particular rate as compared to the rate of translation of the belt 809. For example, within the application zone 883, the screen 851 may be translated at substantially the same rate of translation of the belt 809. That is, the difference in rate of translation between the screen and the belt may be not greater than about 5%, such as not greater than about 3%, or even not greater than about 1% based on the rate of the translation of the screen 851.

Within the application zone 883, the mixture 801 may be extruded from the die 803 and directly onto the screen 851. More particularly, a portion of the mixture 801 may be extruded from the die opening 805, and further extruded through one or more openings in the screen 851 and onto the underlying belt 809. After dispensing the mixture 801 through the die opening 805 and a portion of the mixture 801 through the openings 852 in the screen 851, precursor shaped abrasive particles 853 may be printed on the belt 809 disposed under the screen 851. According to a particular embodiment, the precursor shaped abrasive particles 853 can have a shape substantially replicating the shape of the openings 852.

After extruding the mixture 801 into the openings 852 of the screen 851, the belt 809 and screen 851 may be translated to a release zone 885, wherein the belt 809 and screen 851 can be separated to facilitate the formation of precursor shaped abrasive particles. In accordance with an embodiment, the screen 851 and belt 809 may be separated from each other within the release zone 885 at a particular release angle 855.

During printing, the mixture 801 can be forced through the screen 851 in rapid fashion, such that the average residence time of the mixture 801 within the openings 852 can be less than about 2 minutes, such as less than about 1 minute, less than about 40 second, or even less than about 20 seconds. In particular non-limiting embodiments, the mixture 801 may be substantially unaltered during printing as it travels through the screen openings 852, thus experiencing no change in the amount of components, and may experience no appreciable drying in the openings 852 of the screen 851.

As will be appreciated, after releasing the screen 851 and the belt 809 from each other, the precursor shaped abrasive particles 823 can be translated along the belt 809 for further processing. It will be appreciated that further processing can include shaping, applying a dopant material, drying, sintering, and the like. In fact, the precursor shaped abrasive particles 823 may be translated through a shaping zone, wherein at least one exterior surface of the particles may be shaped. Shaping can include altering a contour of the precursor shaped abrasive particles 823 through one or more processes, such as, embossing, rolling, cutting, engraving, patterning, stretching, twisting, and a combination thereof. In one particular embodiment, the process of shaping can include contacting a shaping structure, having a particular texture to an exterior surface of the precursor shaped abrasive particles 823 to impart the texture to the exterior surface of the particle. It will be appreciated that the shaping structure can take various forms, including for example, a roller having various features on its surface.

According to one particular embodiment, the texturing form for forming a texture on a surface of the abrasive particles can be the belt. For example, the belt can have an upper surface having a particular texture, such that when the mixture 801 is extruded through the openings of the screen 851, the mixture contacts the textured upper surface of the belt 809. Thus at least a portion of the mixture 801 and the resulting abrasive particle can have a texture on a major surface by contacting the textured surface of the belt 809 during printing. Accordingly, precursor shaped abrasive particles 823 can be screen printed having a texture substantially replicating the texture or the inverse of the texture of the upper surface of the belt 809. Moreover, the shaped abrasive particles formed as a result can have a texture on a first major surface, such as the bottom surface of the abrasive particles.

It will be appreciated that other texturing forms may be used in combination with a textured belt to texture other surfaces of the mixture 801 during forming. And in fact, according to another embodiment, the screen printing process may utilize a blade or edge to ensure the mixture 801 is forced into the openings of the screen 851. A surface of the blade may be textured to impart a texture to the upper surface of the mixture 801 as it is forced into the openings of the screen. Accordingly, the first and second major surfaces of the mixture 801 in the openings of the screen can be textured at substantially the same time.

The foregoing method of texturing the mixture in the screen can be based upon contacting an exposed surface of the mixture in the opening of the screen during forming. According to an alternative embodiment, a molding process may also utilize a substrate, which could be a screen or mold blank, having openings, wherein the mixture is disposed into the openings and at least one exposed surface of the mixture can be textured to form a textured preform. For example, the mixture can be forced into an opening of having openings configured to shape a portion of the mixture into a precursor shaped abrasive particle. Unlike the screen, the opening of a mold may have a bottom surface and the opening may not necessarily extend throughout the entire thickness of the substrate. Once the mixture is placed into the mold opening, the upper surface can define an exposed surface of the mixture contained in the mold opening. The exposed surface can be textured using a texturing form, which can include, but not limited to a textured blade, a textured roller, and the like.

FIG. 3 includes a top view of an abrasive particle formed from at least one of the processes herein in accordance with an embodiment. As illustrated, the abrasive particle 300 can include an major surface 301. The major surface can include a textured surface defined by protrusions 310 that are separated by a series of engineered grooves 302, 303, 304, and 305. In accordance with an embodiment, the abrasive particle 300 can be formed to have a liquid management texture. The liquid management texture can include a series of purposefully engineered features (e.g., protrusions and groove), such as in a particular pattern or arrangement, that facilitate the movement of liquid to particular regions in the abrasive particle 300, such as either moving liquid to a particular region of the particle or away from a particular region of the abrasive particle. For example, the liquid management texture can be in the form of a tire tread pattern. In more particular instances, the abrasive particle can have a liquid management texture formed to have a pattern or arrangement of features on the surface configured to direct the liquid to preferential locations on the surface of the abrasive particle 300. For example, in certain embodiments, the liquid management texture can be formed of features designed to direct liquid away from the center 321 of the particle and toward the edge 320 of the abrasive particle 300. In other instances, the liquid management texture formed on the surface 301 of the abrasive particle 300 can be designed to facilitate preferentially directing liquid on the surface 301 toward the center 321 of the abrasive particle 300. Such liquid management texture may facilitate improved material removal and friability characteristics of the abrasive particle 300.

As further illustrated in FIG. 3, the abrasive particle 300 can be formed such that the liquid management texture feature includes grooves 302 and 305 that can intersect each other on the surface 301. Furthermore, the grooves 302 and 305 can have curvilinear contours, such that they curve over the surface of the abrasive particle 300 and intersect the protrusions 310. The shape and positioning of the grooves can further facilitate proper direction of liquid on the surface of the abrasive particle 300.

Figure 4:
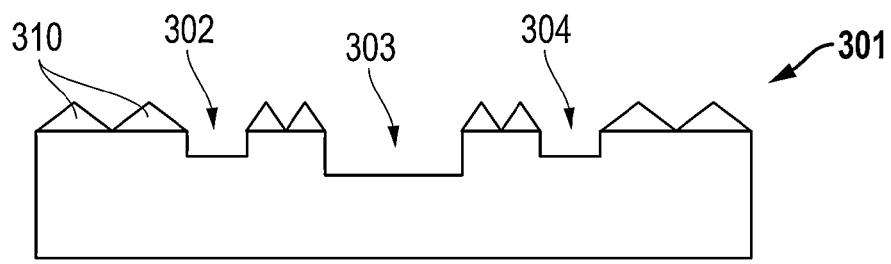
FIG. 4 includes a cross-sectional illustration of a portion of an abrasive particle in accordance with an embodiment.

FIG. 4 includes a cross-sectional illustration of the abrasive particle of FIG. 3. Notably, as illustrated, the grooves 302, 303, and 304 can be formed to have significantly different widths as compared to each other. As will be appreciated, the widths of the grooves are the dimension across the grooves 302-304 in a direction substantially parallel to the surface of the abrasive particle. In particular, the width of the groove 303 can be significantly greater than the width of the groove 302 and 304. As will be appreciated, the formation of features, including grooves, having different features at different positions along the major surface 301 of the abrasive particle 300 can facilitate liquid management on the abrasive particle 300.

As further illustrated in FIG. 4, the groove of the abrasive particle 300 can be formed to have significantly different depths as compared to each other. For example, the groove 303 can be formed to have a significantly greater depth, as measured by the distance the groove extends from the major surface 301 into the volume of the body of the particle 300, as compared to the depths of the groove 302 and 304. Purposeful formation of grooves having significantly different depths as compared to each other can facilitate improved liquid management across the surface of the abrasive particle 300. Moreover, purposeful positioning of grooves of various depths at particular positions along the surface of the abrasive particle 300 can facilitate improved liquid management across the surface of the abrasive particle 300.

While not illustrated, the abrasive particle 300 can be formed to have protrusions 310 of various shapes and contours as compared to each other to further facilitate the control and direction of liquid across the surface of the abrasive particle and improve the abrading capabilities of the abrasive particle 300.

Figure 5:
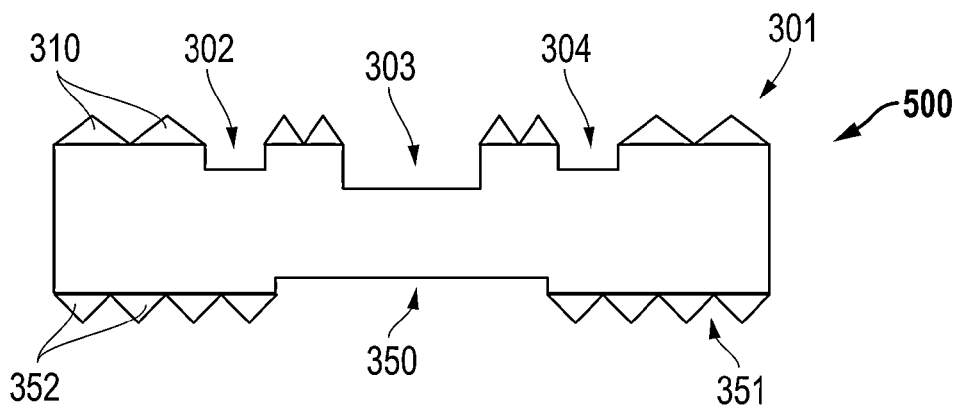
FIG. 5 includes a cross-sectional illustration of a portion of an abrasive particle in accordance with an embodiment.

FIG. 5 includes a cross-sectional illustration of an abrasive particle formed in accordance with an embodiment. As illustrated, the abrasive particle 500 includes a first major surface comprising textured features including protrusions 310 and grooves 302, 303, and 304. Moreover, the abrasive particle 500 includes a second major surface 351, opposite the first major surface 301, including textured features. The textured features include protrusions 352 and a groove 350 formed in the second major surface 351. Notably, the textured pattern of the second major surface 351 is different than the textured pattern of the major surface 301. That is, the combination of the protrusions 352 and the groove 350 can be different than the pattern formed by the combination of protrusion 310 and grooves 302, 303, and 304 presented on the major surface 301. Such features can facilitate liquid management and improved abrasive capabilities of the abrasive particles.

In accordance with an embodiment, the protrusions present in the abrasive particles described herein can have an average feature size of not greater than about 1,000 microns. In other embodiments, the average feature size can be less, such as not greater than about 900 microns, not greater than about 800 microns, not greater than about 700 microns, not greater than about 600 microns, not greater than about 500 microns, not greater than about 400 microns, not greater than about 300 microns, or even not greater than about 200 microns. Still, it will be appreciated that certain protruding features can have an average feature size of at least about 1 micron, such as at least about 3 microns, at least about 5 microns, or even at least about 10 microns. It will be appreciated that protruding features formed on the surfaces of the abrasive particles herein can have an average feature size within a range between any of the minimum and maximum values noted above.

Furthermore, the abrasive particles herein can be formed to have grooves of dimensions similar to that of the protruding features noted above. That is, the grooves can have widths and depths within a range between any of the minimum and maximum values noted above with regard to the average feature size.

As will be appreciated, the abrasive particle 500 can thus be formed such that the second surface 351 opposite the first surface 301 can have a liquid management texture that is different than the liquid management texture presented on the surface 301. Still, embodiments herein contemplate abrasive particles wherein the first major surface 301 and second major surface opposite the first major surface 301 can have the same liquid management texture, which can facilitate swarf removal and friability characteristics of the abrasive particle 500.

The abrasive particles herein can be particles or agglomerated materials formed from a plurality of abrasive grains that are bonded to each other. The abrasive particles can have an average particle size defining the size of an individual grit, particle, or agglomerate body, of not greater than about 3 mm. In certain embodiments, the average particle size can be not greater than about 2 mm, not greater than about 1 mm, or even not greater than about 0.8 mm. Still, the average particle size can be at least about 1 micron, at least about 5 microns, at least about 25 microns, at least about 50 microns, or even at least about 100 microns. It will be appreciated that the average particle size can be within a range between any of the minimum and maximum values noted above.

In accordance with an embodiment, the abrasive particles herein can include abrasive grains having an average grain size of less than about 100 microns. In particular, the average grain size can be less, such as not greater than about 90 microns, not greater than about 300 microns, not greater than about 80 microns, not greater than about 200 microns, not greater than about 75 microns, not greater than about 50 microns, not greater than about 25 microns, or even not greater than about 10 microns. Still, it will be appreciated that the abrasive grains can have an average grain size that is at least about 0.01 microns, such as at least 0.05 microns, at least about 0.1 microns, at least about 0.5 microns, at least about 0.8 microns, at least about 1 micron, at least about 2 microns, or even at least about 5 microns. It will be appreciated that the average grain size can be within a range between any of the minimum and maximum values noted above.

Figure 6:
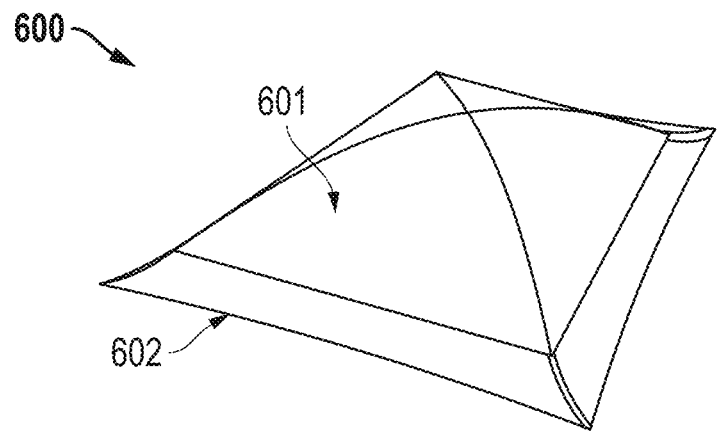
FIG. 6 includes an illustration of an abrasive particle in accordance with an embodiment.

FIG. 6 includes an illustration of an abrasive particle in accordance with an embodiment. Notably, the abrasive particle 600 can include an upper face 601. Moreover, the abrasive particle 600 can include a bottom face 602 away from the upper face.

Figure 7:
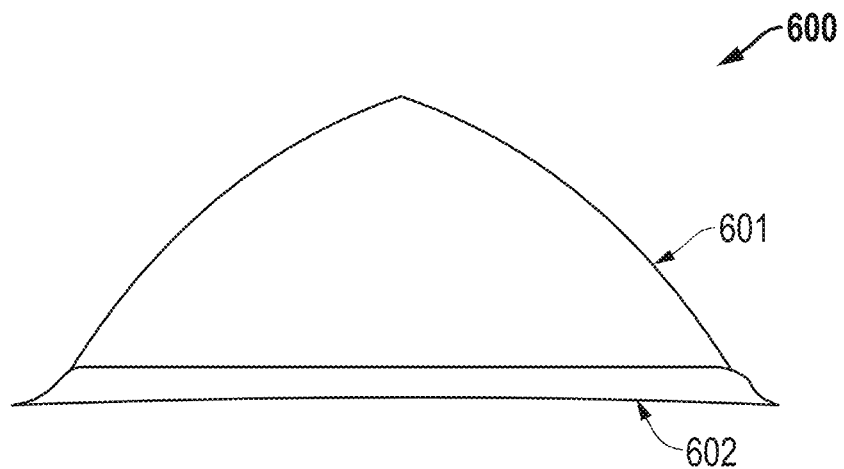
FIG. 7 includes a cross-sectional illustration of an abrasive particle in accordance with an embodiment.

FIG. 7 includes a cross-sectional illustration of the abrasive particle 600. As illustrated in FIGS. 6 and 7, the upper face can have a particular texture suitable for material removal operations. That is, the upper face 601 can have ridges and points suitable for cutting, grinding, and polishing of workpieces. By contrast, the bottom face 602 can have a contour that is significantly different than the contour present on the upper face 601. In accordance with an embodiment, the abrasive particle 600 can be formed such that the bottom face 602 comprises an orientation texture that is configured to preferentially orient the abrasive particle 600 in an upright position as illustrated in FIGS. 6 and 7. Notably, preferential orientation of an abrasive particle 600 in an upright position can naturally present the abrasive particle 600 in a position to be the most effective for material removal operations. Accordingly, reference to an upright position is generally a position wherein the sharper edges or surfaces (i.e., the upper face 601) of the abrasive particle are present at a greater height than other surfaces (i.e., the bottom surface). An abrasive particle that preferentially orients in an upright position is an abrasive particle that when dropped onto a substrate has a greater than 50/50 likelihood of orienting in the upright position, as illustrated in FIGS. 6 and 7.

In particular instances, the abrasive particle 600 can be formed such that the upper face 601 can have a slightly curvilinear contour. Moreover, the bottom face can have a substantially flat or convex surface contour, such that the bottom face 602 can be bowed in, toward the interior volume of the abrasive particle 600. The combination of such surface contours facilitate the preferential orientation of the body of the abrasive particle 600 in the upright position as illustrated in FIGS. 6 and 7.

Figure 9A:
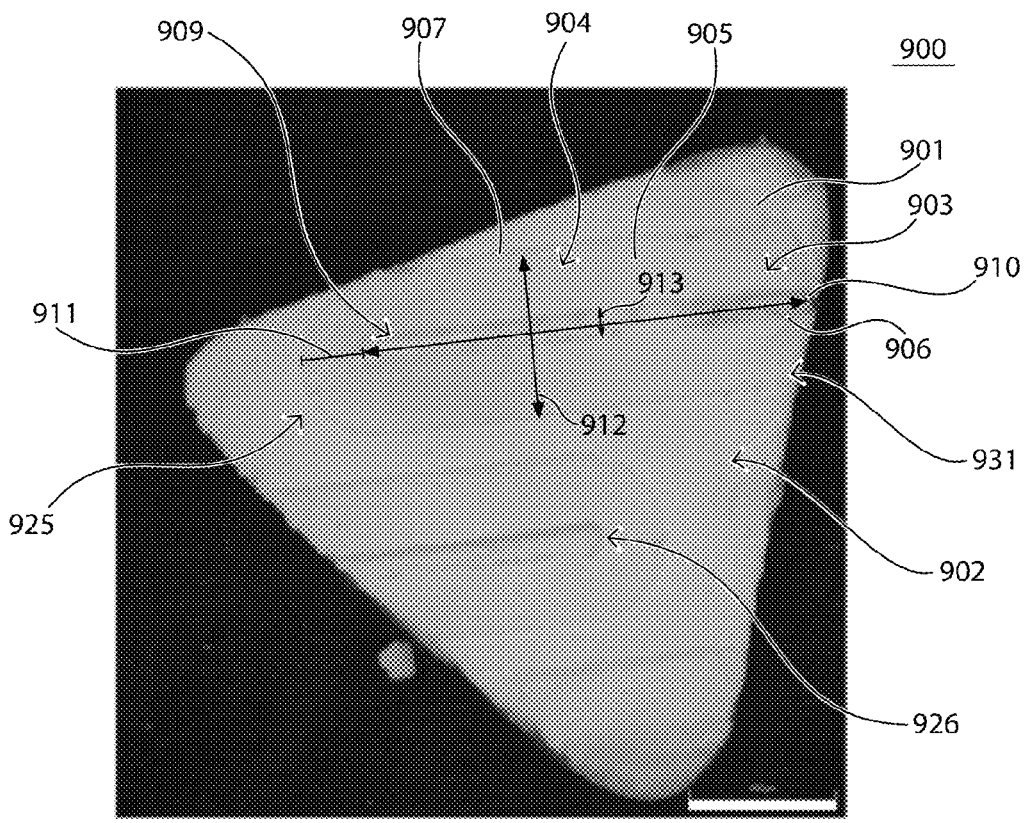
FIG. 9A includes a top view image of a shaped abrasive particle formed according to an embodiment.

FIG. 9A includes a top view image of a shaped abrasive particle formed according to an embodiment. As illustrated, the shaped abrasive particle 900 can include a body 901 including a major surface 902 having a liquid management texture 903. According to one embodiment, the liquid management texture 903 can include a recessed-protrusion surface feature 904. More particularly, the major surface 902 of the body 901 can include a plurality of recessed-protrusion surface features, which can be spaced apart from each other on the major surface 902.

In certain instances, the recessed-protrusion surface feature can include a discrete recess 905 and a protrusion 906 that can be contained entirely within the recess 905. In particular instances, the recess can be defined by a periphery 907 that can substantially surround the protrusion 906. In particular instances, the recess 905 can have a bottom surface 908 and the protrusion 906 can extend from the bottom surface 908 away from the body 901. In one particular embodiment, the edge or boundary of the protrusion 906 where the protrusion 906 intersects the bottom surface 908 can be spaced apart from the periphery 907 of the recess 905.

According to one embodiment, the protrusion 906 can have a length, which is the longest dimension of the protrusion 906 extending along the axis 910. The length of the protrusion 906 can be different than a length of the recess, which is the longest dimension of the recess 905 extending along the axis 911. In particular, the axis 910 and 911 can be parallel to each other. More particularly, the axis 910 of the protrusion 906 and the axis 911 of the protrusion 910 can define the same line, thus defining the protrusion 906 as centered within the recess 905 along the axis 911. In certain instances, the protrusion 906 can have a length of not greater than about 95% of the length of the recess. In still other instances, the length of the protrusion 906 can be less, such as not greater than about 90%, not greater than about 80%, not greater than about 70%, not greater than about 60%, not greater than about 50%, not greater than about 40%, not greater than about 30%, not greater than about 20%, or even not greater than about 10% of the length of the recess 905. Still, in another non-limiting embodiment, the protrusion 906 can have a length of at least about 10%, such as at least about 20%, at least about 30%, at least about 40%, at least about 50%, at least about 60%, at least about 70%, at least about 80%, or even at least about 90%. The length of the protrusion 906 can be within a range between any of the minimum and maximum percentages noted above.

Moreover, as illustrated, the recess 905 can have a width, measured along the axis 912 as a dimension perpendicular to the axis 911 between sides of the recess defining the periphery 907. The protrusion 906 can have a width, measured along the axis 913 as a dimension perpendicular to the axis 910. The width of the protrusion 906 can be different than a width of the recess. In certain instances, the protrusion 906 can have a width of not greater than about 95% of the width of the recess. In still other instances, the width of the protrusion 906 can be less, such as not greater than about 90%, not greater than about 80%, not greater than about 70%, not greater than about 60%, not greater than about 50%, not greater than about 40%, not greater than about 30%, not greater than about 20%, or even not greater than about 10% of the width of the recess 905. Still, in another non-limiting embodiment, the protrusion 906 can have a width of at least about 10%, such as at least about 20%, at least about 30%, at least about 40%, at least about 50%, at least about 60%, at least about 70%, at least about 80%, or even at least about 90%. The width of the protrusion 906 can be within a range between any of the minimum and maximum percentages noted above.

Figure 9B:
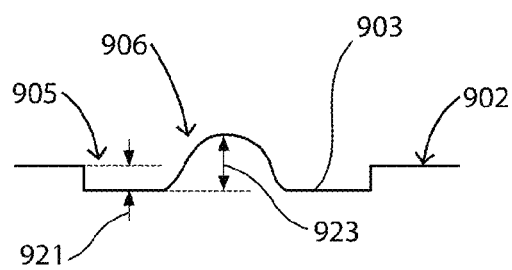
FIG. 9B includes a cross-sectional illustration of a portion of the shaped abrasive particle of FIG. 9A.

Moreover, as illustrated, the recess 905 can have a depth 921, measured as the distance between the major surface 902 and the bottom surface 903 of the recess, as illustrated in FIG. 9B, which is a cross-sectional illustration of a recessed-protrusion surface feature of FIG. 9A. The protrusion 906 can have a height 923 measured as the distance between the bottom surface 903 and the upper-most point of the protrusion 906 furthest from the bottom surface 903. The height 923 of the protrusion 906 can be different than the depth 921 of the recess 905. For example, the depth 921 of the recess 905 can be less than the height 923 of the protrusion 906, such as not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the height 923 of the protrusion 906. Still, in another non-limiting embodiment, the recess 905 can have a depth 921 of at least about 10%, such as at least about 20%, at least about 30%, at least about 40%, at least about 50%, at least about 60%, at least about 70%, at least about 80%, or even at least about 90% of the height 923 of the protrusion 906. The depth 921 of the recess relative to the height 923 of the protrusion 906 can be within a range between any of the minimum and maximum percentages noted above.

According to a particular embodiment, wherein the recess 905 can be formed to have a rounded end 925. Moreover, as illustrated in FIG. 9A, the recess 905 can extend in a substantially linear direction along the axis 911. Moreover, the protrusion 906 can have a rounded end 926. The protrusion 906 can extend in a substantially linear direction along the axis 910. As further illustrated, the axis 911 and axis 910 can be essentially the same.

In certain instances, such as illustrated in FIG. 9A, portions of the liquid management texture can intersect an edge between the major surface 902 and a side surface 928 of the particle. For example, the recess 905 and protrusion 906 can intersect the edge 931 of the major surface 902 of the body 901.

According to an alternative embodiment, the liquid management texture can also include a double-recessed surface feature. The double-recessed surface feature can have substantially the same appearance as the recessed-protrusion surface feature, except that the protrusion is replaced with a recess extending into the surface of the body. According to one particular embodiment, the double-recessed surface feature can include a first groove (or recess) extending into the body and a second groove extending into the body. The double-recessed surface feature can have any of the features described in accordance with the recessed-protrusion surface feature.

For example, according to one embodiment, the second groove can be contained entirely within the first groove. Moreover, in one particular embodiment, the edge or boundary of the second groove can be spaced apart from the periphery of the first groove.

According to one embodiment, the second groove, which is positioned within the first groove, can have a length of not greater than about 95% such as not greater than about 90%, not greater than about 80%, not greater than about 70%, not greater than about 60%, not greater than about 50%, not greater than about 40%, not greater than about 30%, not greater than about 20%, or even not greater than about 10% of the length of the first groove. Still, in another non-limiting embodiment, the second groove can have a length of at least about 10%, such as at least about 20%, at least about 30%, at least about 40%, at least about 50%, at least about 60%, at least about 70%, at least about 80%, or even at least about 90% of the first groove. The length of the second groove can be within a range between any of the minimum and maximum percentages noted above.

Moreover, as illustrated, the first groove can have a width that can be different than a width of the second groove. In certain instances, the second groove can have a width of not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the width of the first recess. Still, in another non-limiting embodiment, the second recess can have a width of at least about 10%, such as at least about 20%, at least about 30%, at least about 40%, at least about 50%, at least about 60%, at least about 70%, at least about 80%, or even at least about 90% of the width of the first groove. The width of the second groove can be within a range between any of the minimum and maximum percentages noted above.

Figure 9C:
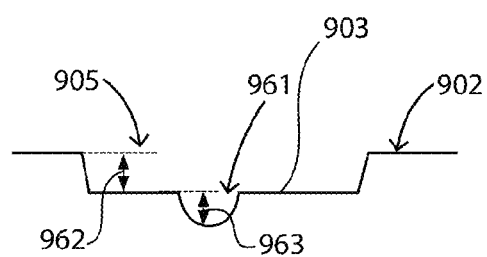
FIG. 9C includes a cross-sectional illustration of a portion of a shaped abrasive particle according to an embodiment.

Moreover, as illustrated in FIG. 9C, which includes a cross-sectional view of a portion of the double-recessed surface feature can include a first groove 905 having a depth 962, measured as the distance between the major surface 902 and the bottom surface 903 of the first groove 903, as illustrated in FIG. 9C. The second groove 961 can have a depth 962 measured as the distance between the bottom surface 903 and the lowest-most point of the second groove 961 furthest from the bottom surface 903. The depth of the second groove 961 can be different than the depth 962 of the first groove 905. For example, the depth 962 of the first groove 905 can be less than the depth 963 of the second groove 961, such as not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the depth of the second groove 961. Still, in another non-limiting embodiment, the groove 905 can have a depth 962 of at least about 10%, such as at least about 20%, at least about 30%, at least about 40%, at least about 50%, at least about 60%, at least about 70%, at least about 80%, or even at least about 90% of the depth 963 of the second groove 961. The depth 962 of the first groove 905 relative to the depth 963 of the second groove 961 can be within a range between any of the minimum and maximum percentages noted above.

According to a particular embodiment, wherein the first groove and/or second groove can be formed to have a rounded ends. Moreover, the first and second grooves can extend in a substantially linear direction along a same axis.

Additionally, the first groove can intersect at least one side surface of the body. Moreover, the second groove can intersect intersects at least one side surface of the body.

Figure 10A:
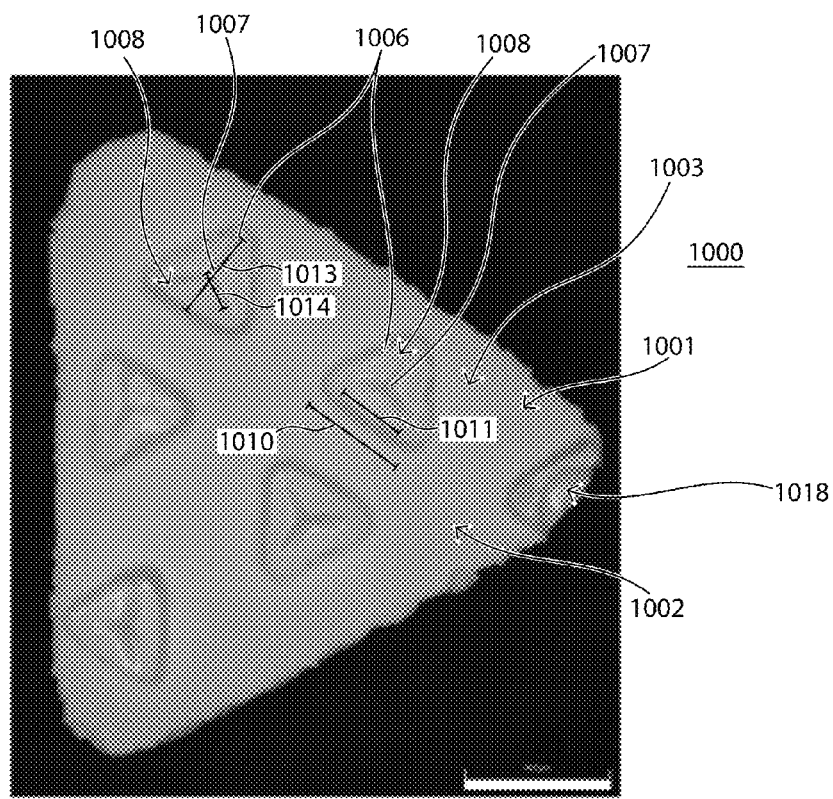
FIGS. 10A-10B include top view images of shaped abrasive particles according to embodiments.

FIG. 10A includes a top view image of a shaped abrasive particle formed according to an embodiment. As illustrated, the shaped abrasive particle 1000 can include a body 1001 including a major surface 1002 having a liquid management texture 1003. According to one embodiment, the liquid management texture 1003 can include a recessed-protrusion surface feature 1004. More particularly, the major surface 1002 of the body 1001 can include a plurality of recessed-protrusion surface features, which can be spaced apart from each other on the major surface 1002.

In certain instances, the recessed-protrusion surface feature 1003 can include one or more discrete protrusions 1006 spaced apart from each other across the major surface 1002 of the body 1001 and extending from the major surface 1002 of the body 1001. According to one embodiment, each of the protrusions 1006 can have a recess 1007 that can be contained entirely within the protrusion 1006, and more particularly, each recess 1007 can be contained entirely within an upper surface 1008 of the protrusions 1007. In one embodiment, the recess 1007 can be spaced apart from the edges of the protrusion 1006 defining the upper surface 1008

The protrusion 1006 can have a length 1010, measured as the longest dimension of a side of the protrusion 1006 defining the upper surface 1008. The recess 1007 can have a length 1011, as measured as the longest dimension of a side as viewed from the top. The length 1011 of the recess 1007 can be different than the length 1010 of the protrusion 1006, including for example, not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the length 1010 of the protrusion 1006. Still, in another non-limiting embodiment, the recess 1007 can have a length 1011 of at least about 10%, such as at least about 20%, at least about 30%, at least about 40%, at least about 50%, at least about 60%, at least about 70%, at least about 80%, or even at least about 90% of the length 1010 of the protrusion 1006. The length 1011 of the recess 1007 relative to the length 1010 of the protrusion 1006 can be within a range between any of the minimum and maximum percentages noted above.

The protrusion 1006 can have a width 1013, measured as the longest dimension of the upper surface 1008 extending in a direction through a midpoint of the upper surface 1008. The recess 1007 can have a width 1014, as measured as the longest dimension of the recess through a midpoint. The width 1014 of the recess 1007 can be different than the width 1013 of the protrusion 1006, including for example, not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the width 1013 of the protrusion 1006. Still, in another non-limiting embodiment, the recess 1007 can have a width 1014 of at least about 10%, such as at least about 20%, at least about 30%, at least about 40%, at least about 50%, at least about 60%, at least about 70%, at least about 80%, or even at least about 90% of the width 1013 of the protrusion 1006. The width 1014 of the recess 1007 relative to the width 1013 of the protrusion 1006 can be within a range between any of the minimum and maximum percentages noted above.

The protrusion 1006 can have a height, measured as the longest dimension between the major surface 1003 of the body 1001 and the upper surface 1008 of the protrusion 1006 extending in a direction substantially perpendicular to the plane of the upper surface 1008 define by the length 1010 and width of the upper surface 1008. Analysis of the height of the protrusion 1006 may be conducted in a side-view of the body 1001. The recess 1007 can have a depth, as measured as the longest dimension of the recess from the upper surface 1008 of the protrusion 1006 into the volume of the protrusion in a direction extending toward the upper surface 1002 of the body 1001 and in a direction substantially perpendicular to the plane of the upper surface 1008. The depth of the recess 1007 can be different (e.g., less or greater) than the height of the protrusion 1006, including for example, not greater than about 95%, such as not greater than about 90%, not greater than about 80%, not greater than about 70%, not greater than about 60%, not greater than about 50%, not greater than about 40%, not greater than about 30%, not greater than about 20%, or even not greater than about 10% of the height of the protrusion 1006. Still, in another non-limiting embodiment, the recess 1007 can have a depth of at least about 10%, such as at least about 20%, at least about 30%, at least about 40%, at least about 50%, at least about 60%, at least about 70%, at least about 80%, or even at least about 90% of the height of the protrusion 1006. In at least one particular embodiment, the height of the protrusion 1006 can be greater than a depth of the recess 1007. The depth of the recess 1007 relative to the height of the protrusion 1006 can be within a range between any of the minimum and maximum percentages noted above.

As illustrated, the recess 1007 can have an irregular shape. For example, in certain instances, the recess 1007 can have an irregular polygonal two-dimensional shape as viewed from the top in a plane defined by the length and width of the upper surface 1008, as shown in FIG. 10A. In one particular embodiment, the recess 1007 can have a two-dimensional shape defining three arms. Furthermore, the protrusion 1006 can have a polygonal two-dimensional shape as viewed from the top in a plane defined by the length and width of the upper surface 1008, as shown in FIG. 10A. In particular instances, the protrusion 1006 can have an upper surface 1008 defining a substantially triangular two-dimensional shape, and the recess 1007 can have a two-dimensional shape defining three arms, wherein each of the arms are extending in a direction substantially toward the corners of the triangular two-dimensional shape of the upper surface 1008 of the protrusion 1006.

Moreover, in certain instances, the liquid management texture can include at least one partial recessed-protrusion feature at an edge of the body 1001. For example, as illustrated in FIG. 10A, the body 1001 can include a partial recessed-protrusion feature 1018 at the edge of the body defined by the end of the major surface 1002.

According to a particular embodiment, any one of the protrusions 1006 of the recessed-protrusion surface features 1003 can have an upper surface area as defined by the area of the upper surface 1008, which can have a particular size relative to the area of the major surface 1002 of the body 1001. For example, the area of the upper surface 1008 can be not greater than about 50%, such as not greater than about 40%, not greater than about 30%, not greater than about 20%, or even not greater than about 10% of the total surface area of the major surface 1002 of the body 1001. Still, in another non-limiting embodiment, the major surface 1008 can have an area of at least about 5%, such as at least about 10%, such as at least about 15%, at least about 20%, at least about 25%, at least about 30%, or even at least about 35% of the total surface area of the major surface of the protrusion 1006. The area of the upper surface 1008 relative to the total surface area of the major surface 1002 of the body 1001 can be within a range between any of the minimum and maximum percentages noted above.

Figure 10B:
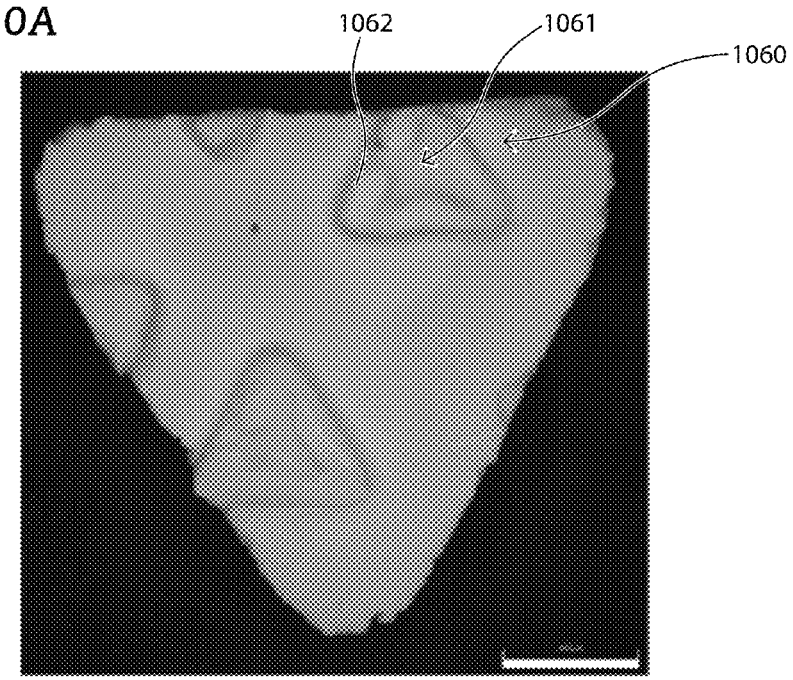

FIG. 10B includes a top view image of an alternative embodiment of a shaped abrasive particle having a liquid management texture including recessed-protrusion surface features similar to those illustrated in FIG. 10A. In particular, FIG. 10B illustrates the formation of recessed-protrusion surface features 1060 of a greater size relative to those provided in FIG. 10A. Moreover, FIG. 10B demonstrates recesses 1061 within the protrusions 1062 having alternative two-dimensional shapes in accordance with an embodiment.

Figure 11A:
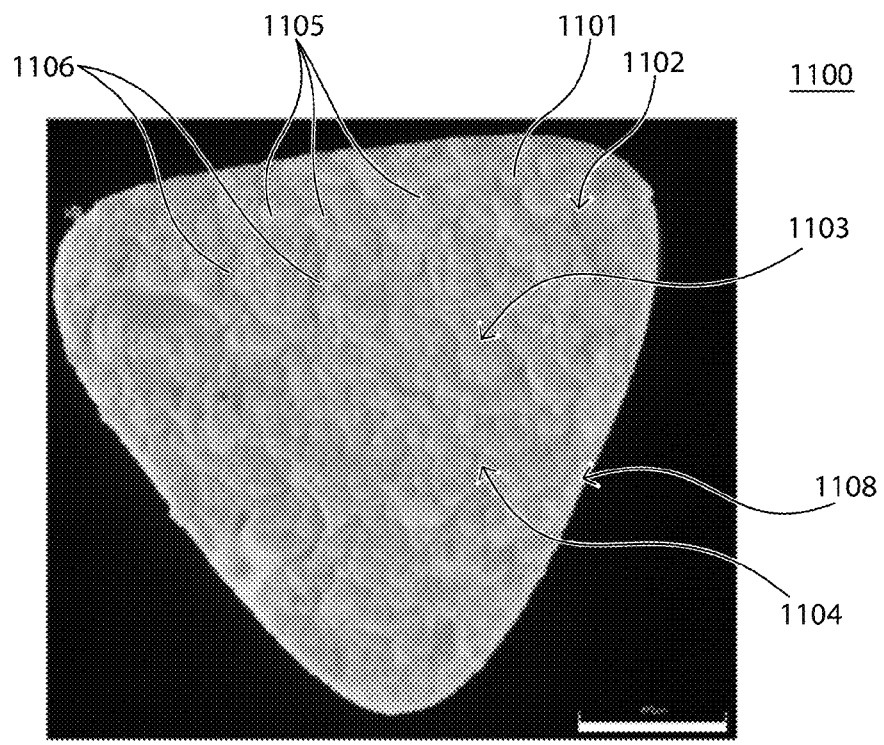
FIGS. 11A-11B include top view images of shaped abrasive particles according to embodiments.

FIG. 11A includes a top view image of a shaped abrasive particle formed according to an embodiment. As illustrated, the shaped abrasive particle 1100 can include a body 1101 including a major surface 1102 having a liquid management texture 1103. According to one embodiment, the liquid management texture 1103 can include a pebbled surface feature 1104 including one or more protrusions 1105. The pebbled surface feature 1104 may have the appearance of a random gathering of pebbles. More particularly, the major surface 1102 of the body 1101 can include a plurality of protrusions 1105 extending from the major surface 1102 and a plurality of channels 1106 extending between the plurality of protrusions 1105.

The pebbled surface feature 1104 can include protrusions 1105 having a rounded upper surface, and more particularly, each of the protrusions 1105 of the plurality of protrusions can have a rounded upper surface. Moreover, as illustrated in FIG. 11A, each of the protrusions 1105 of the plurality of protrusions can have substantially rounded sides. In certain instances, some of the protrusions 1105 or a majority of the protrusions 1105 can have an irregular shape, and more particularly an irregular ellipsoidal shape.

According to an embodiment, at least a portion of the channels 1106 of the pebbled surface feature 1104 can have a different shape with respect to each other. More particularly, as illustrated in FIG. 11A, at least a portion of the channels 1106, or even substantially all of the channels 1106 of the plurality of channels can have a tortuous path between the protrusions 1105.

According to one embodiment, at least two of the protrusions 1105 of the plurality of protrusions can be significantly different in size with respect to each other. For example, the length, or the longest dimension of the protrusions 1105 as viewed from the top can be at least about 10% different with respect to each other. In one embodiment, the plurality of protrusions can have an average length of at least about 0.1 microns and not greater than about 1 mm. Alternatively, the protrusions 1105 can have an average size within a range of other protrusions of the embodiments herein.

The pebbled surface feature 1104 can have a surface roughness greater than a surface roughness of a second surface of the body 1101 spaced apart from the major surface 1102. For example, the pebbled surface feature 1104 can have a surface roughness that is significantly greater than a side surface of the body 1101 or an opposite major surface (e.g., an upper major surface) of the body 1101 that can be spaced apart from the major surface 1102 by one or more side surfaces.

Figure 11B:
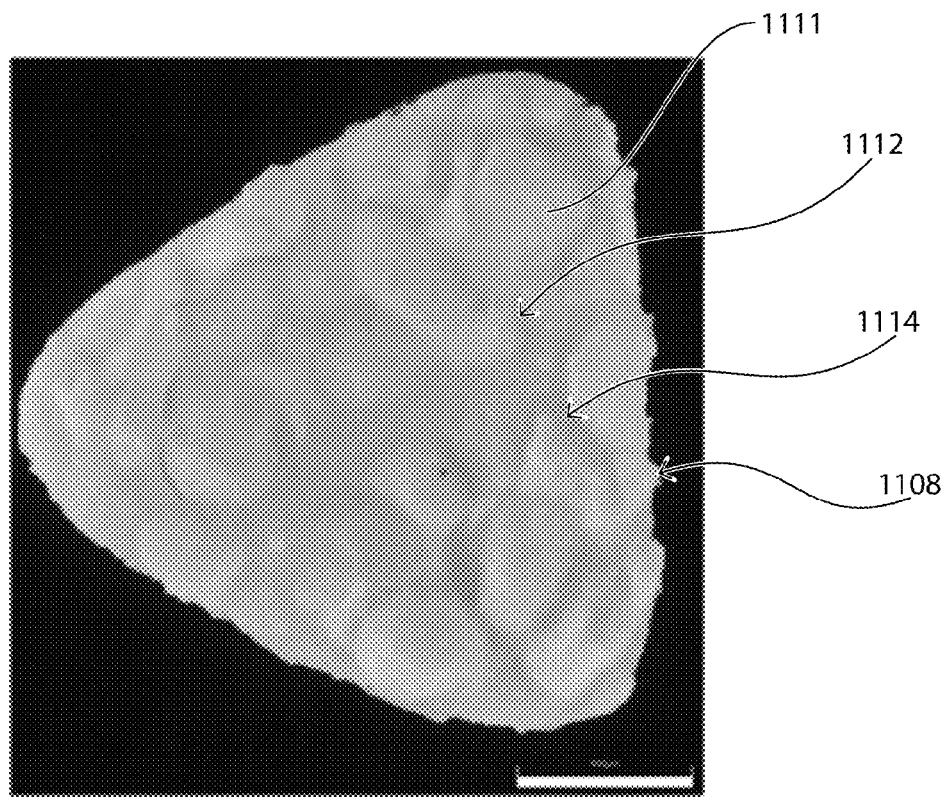

In another embodiment, the pebbled surface feature 1104 can define a fractured region at the edge 1108 of the major surface 1102 of the body 1101. The edge 1108 of the major surface 1102 can define a joining of the major surface 1102 and a side surface of the body 1101. FIG. 11B includes an image of a shaped abrasive particle including a liquid management texture according to an embodiment. In particular, FIG. 11B includes a pebbled surface feature 1114 and a fractured region 1118 at the edge of the body 1111 between the major surface 1112 and a side surface. As illustrated, the fractured region can define a region of the edge having an irregular arrangement of protrusions and grooves, wherein the protrusions and grooves are spaced apart from each other at irregular intervals and the size and shape of the protrusions and grooves can be substantially random. The fractured region 1118 can be in the form of an irregular scalloped edge. The fractured region 1118 may be the result of the particular pebbled surface feature 1104.

Figure 12A:
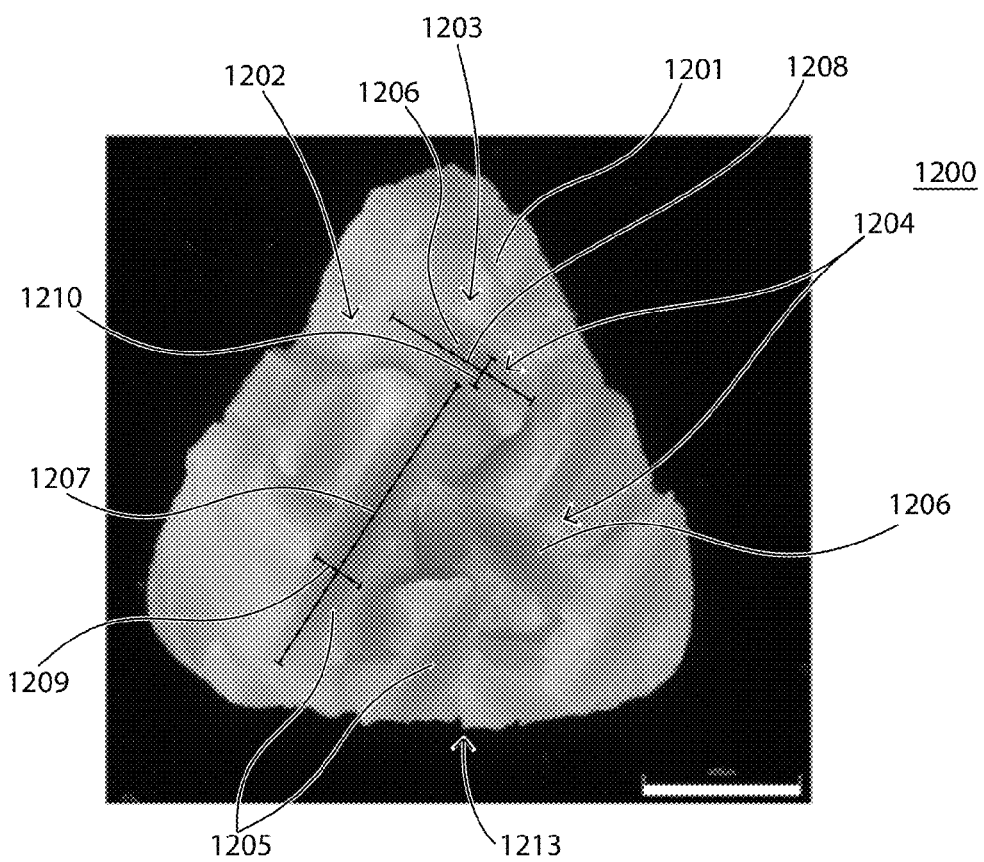
FIGS. 12A-12B include top view images of shaped abrasive particles according to embodiments.

FIG. 12A includes a top view image of a shaped abrasive particle formed according to an embodiment. As illustrated, the shaped abrasive particle 1200 can include a body 1201 including a major surface 1202 having a liquid management texture 1203. According to one embodiment, the liquid management texture 1203 can include intersecting grooves, and more particularly, t-shaped grooves 1204 extending across at least a portion of the major surface 1202. The t-shaped grooves 1204 can include a longitudinal groove 1205 and a lateral groove 1206 intersecting the longitudinal groove 1205.

In one embodiment, the longitudinal groove 1205 can have a length 1207, measured as the longest dimension between lateral grooves along the axis of the groove that can be greater than a length 1208 of the lateral groove 1206, which can be measured as the longest dimension of the groove along the axis of the groove. According to a particular embodiment, the lateral groove 1206 can have a length 1208 of not greater than about 90%, such as not greater than about 80%, not greater than about 70%, not greater than about 60%, not greater than about 50%, not greater than about 40%, not greater than about 30%, not greater than about 20%, or even not greater than about 10% of the length 1207 of the longitudinal groove 1205. Still, in another non-limiting embodiment, the lateral groove 1206 can have a length 1208 of at least about 10%, such as at least about 20%, at least about 30%, at least about 40%, at least about 50%, at least about 60%, at least about 70%, at least about 80%, or even at least about 90% of the length 1207 of the longitudinal groove 1205. The length 1208 of lateral groove 1206 relative to the length 1207 of the longitudinal groove 1205 can be within a range between any of the minimum and maximum percentages noted above.

In one embodiment, the longitudinal groove 1205 can have a width 1209, measured as the longest dimension of the groove perpendicular to the axis of the groove defining the length 1207. The lateral groove 1206 can have a width 1210, which can be measured as the longest dimension of the groove perpendicular to the axis of the groove defining the length 1208. According to a particular embodiment, the lateral groove 1206 can have a width 1210 of not greater than about 90%, such as not greater than about 80%, not greater than about 70%, not greater than about 60%, not greater than about 50%, not greater than about 40%, not greater than about 30%, not greater than about 20%, or even not greater than about 10% of the width 1209 of the longitudinal groove 1205. Still, in another non-limiting embodiment, the lateral groove 1206 can have a width 1210 of at least about 10%, such as at least about 20%, at least about 30%, at least about 40%, at least about 50%, at least about 60%, at least about 70%, at least about 80%, or even at least about 90% of the width 1209 of the longitudinal groove 1205. The width 1210 of lateral groove 1206 relative to the width 1209 of the longitudinal groove 1205 can be within a range between any of the minimum and maximum percentages noted above.

In at least one embodiment, such as illustrated in FIG. 12A, the intersecting grooves can extend to an edge of the major surface 1202 of the body 1201. In particular, the edge 1213 can have a fractured region, defined in part by one or more irregular protrusions and grooves. The edge 1213 having the fractured region can have an appearance of an irregular serrated surface, wherein the protrusions and grooves are spaced apart from each other at irregular intervals and the size and shape of the protrusions and grooves can be substantially random. The fractured region can be in the form of an irregular scalloped edge.

Figure 12B:
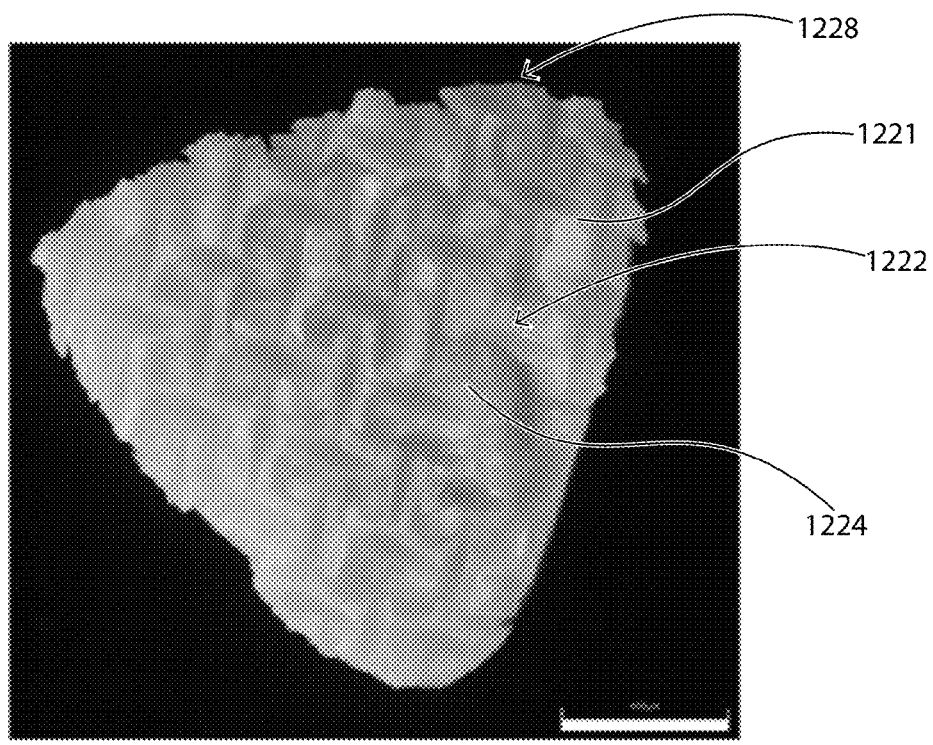

FIG. 12B includes an image of a shaped abrasive particle including a liquid management texture according to an embodiment. In particular, FIG. 12B includes a t-shaped surface feature 1224 and a fractured region 1228 at the edge of the body 1221 between the major surface 1222 and a side surface. As illustrated, the fractured region can define a region of the edge having an irregular arrangement of protrusions and grooves, wherein the protrusions and grooves are spaced apart from each other at irregular intervals and the size and shape of the protrusions and grooves can be substantially random. Moreover, as illustrated, the t-shaped surface features can include longitudinal grooves 1225 and lateral grooves 1226 that are substantially smaller in size as compared to the longitudinal grooves 1205 and lateral grooves 1206 of the t-shaped surface features of FIG. 12A.

The liquid management texture of the embodiments herein can be configured to limit agglomeration of a plurality of shaped abrasive particles having the liquid management texture. In particular, it has been observed that the formation of a liquid management texture according to the embodiments can facilitate limited agglomeration of the particles, which can improve handling and deployment of the particles in fixed abrasive articles. Notably, the use of certain liquids, such as water or organic compounds, such as silanes, with shaped abrasive particles without liquid management texture can be significantly more difficult and result in significant agglomeration.

The abrasive particles of the embodiments herein may be particular suitable for use in fixed abrasives, such as a coated abrasive, which can include a substrate and a make coat overlying a surface of the substrate. The coated abrasive can further include abrasive particulate material. The abrasive particulate material can include the shaped abrasive particles of embodiments herein, and may further include other types of abrasive particulate material, such as diluent abrasive particles having a random shape, which may not necessarily be shaped abrasive particles. The coated abrasive may further include size coat overlying and bonded to the abrasive particulate material and the make coat.

According to one embodiment, the substrate can include an organic material, inorganic material, and a combination thereof. In certain instances, the substrate can include a woven material. However, the substrate may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat can be applied to the surface of the substrate in a single process, or alternatively, the abrasive particulate materials can be combined with a make coat material and applied as a mixture to the surface of the substrate. Suitable materials of the make coat can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat can include a polyester resin. The coated substrate can then be heated in order to cure the resin and the abrasive particulate material to the substrate. In general, the coated substrate can be heated to a temperature of between about 100° C. to less than about 250° C. during this curing process.

The abrasive particulate material can include shaped abrasive particles according to embodiments herein. In particular instances, the abrasive particulate material may include different types of shaped abrasive particles. The different types of shaped abrasive particles can differ from each other in composition, two-dimensional shape, three-dimensional shape, size, texture features, and a combination thereof as described in the embodiments herein. As illustrated, the coated abrasive can include a shaped abrasive particle having a generally triangular two-dimensional shape.

The other type of abrasive particles can be diluent particles different than the shaped abrasive particles. For example, the diluent particles can differ from the shaped abrasive particles in composition, two-dimensional shape, three-dimensional shape, size, and a combination thereof. For example, the abrasive particles can represent conventional, crushed abrasive grit having random shapes. The abrasive particles may have a median particle size less than the median particle size of the shaped abrasive particles 1805.

After sufficiently forming the make coat with the abrasive particulate material, the size coat can be formed to overlie and bond the abrasive particulate material in place. The size coat can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

EXAMPLES

Example 1

A sample of comparative shaped abrasive particles (CS1) are formed from a mixture in the form of a gel having approximately 42% solids loading of boehmite commercially available as Catapal B from Sasol Corp. combined with 58 wt % water containing a minority content of nitric acid and organic additives. The gel has a range of viscosity from $3 \times 10^3$ to $4 \times 10^4$ Pa·s and range of storage modulus of from $3 \times 10^4$ to $2 \times 10^5$ Pa.

Figure 13A:
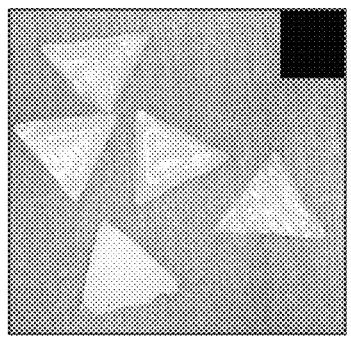
FIG. 13A includes an image of shaped abrasive particles.

The gel is extruded from a die and extruded into openings of a mold having equilateral triangular-shaped openings having a length of a side of approximately 1-2.5 mm. The surfaces of the mold are substantially smooth and untextured. The gel is dried for approximately 24-48 hours in air under atmospheric conditions within the mold to form precursor shaped abrasive particles. The precursors shaped abrasive particles were sintered in a tube furnace up to approximately 1300° C. for 3 to 20 minutes. FIG. 13A is an image of representative particles from sample CS1. Notably, the major surfaces of the shaped abrasive particles of CS1 are substantially smooth and untextured.

Figure 13B:
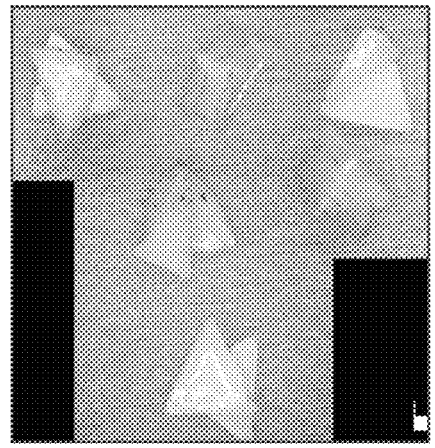
FIG. 13B includes an image of shaped abrasive particles after a surface treatment process.

The particles are then subject to a surface treatment wherein a liquid including silane, commercially available as Silquest Silane A-1100 [(3-Aminopropyl)tri-ethoxysilane] is deposited on the particles via a Silane treatment process, which includes forming a solution including 0.25 g of Silquest Silane A-1100, 8.82 g of deionized water and some Acetic acid, glacial in order to achieve a pH of approximately 5. The solution is then mixed with the grains and the operator must stir the grains into the solution with a spatula in order to homogenize the surface treatment and until the solution has been incorporated into the grains. The sample is placed in a box oven at 80° C. for approximately 10-16 hours. After the surface treatment, the particles exhibited severe agglomeration, as illustrated in FIG. 13B.

Example 2

A sample of representative shaped abrasive particles (S2) are formed from a mixture in the form of a gel having approximately 42% solids loading of boehmite commercially available as Catapal B from Sasol Corp. combined with 68 wt % water containing a minority content of nitric acid and organic additives. The gel has a range of viscosity from $3 \times 10^3$ to $4 \times 10^4$ Pa·s and range of storage modulus of from $3 \times 10^4$ to $2 \times 10^5$ Pa.

The gel is extruded from a die and extruded into openings of a screen having equilateral triangular-shaped openings having a length of a side of approximately 1-2.5 mm. A belt underlying the openings of the screen is textured and imparts recessed-protrusion surface features on a major bottom surface of the mixture in contact with the belt. The belt is coated with canola oil. The particles are dried and then sintered at 1300° C. to 1400° C. for 3 to 20 minutes in a tube furnace in air.

Figure 14A:
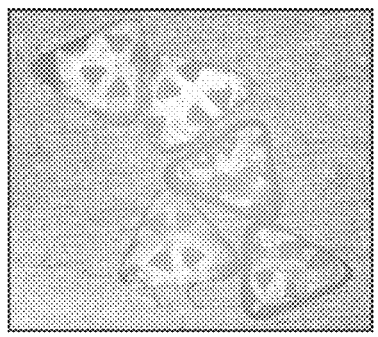
FIG. 14A includes an image of shaped abrasive particles according to an embodiment.
Figure 14B:
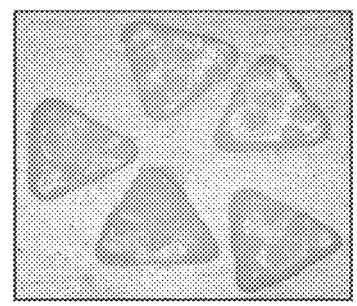
FIG. 14B includes an image of shaped abrasive particles according to an embodiment after a surface treatment process.

Representative particles of sample S2 are illustrated in FIG. 14A. The particles of sample S2 are subject to the surface treatment process detailed in Example 1. After conducting the surface treatment process, the shaped abrasive particles of sample S2 demonstrated significantly less agglomeration, as illustrated by representative particles in FIG. 14B.

Example 3

Figure 15A:
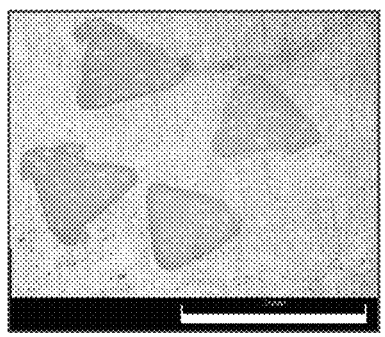
FIG. 15A includes an image of shaped abrasive particles according to an embodiment.
Figure 15B:
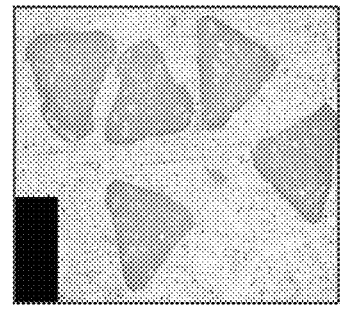
FIG. 15B includes an image of shaped abrasive particles according to an embodiment after a surface treatment process.

A sample of representative shaped abrasive particles (S3) are formed according to the method of Example 2, however a belt with a different texture was used to impart a pebbled surface feature to a major surface of the gel in the screen. Representative particles of sample S3 are illustrated in FIG. 15A. The particles of sample S3 were subject to the surface treatment process detailed in Example 1. After conducting the surface treatment process, the shaped abrasive particles of sample S3 demonstrated significantly less agglomeration, as illustrated by representative particles in FIG. 15B.

The embodiments herein can utilize one or more combinations of features, including a combination of forming processes to facilitate the formation of abrasive particles having a combination of features. Such features can include, a textured front surface, textured rear surface, combination of protrusions and grooves having particular shapes and orientations relative to each other, liquid management texture, features of particular sizes, and surfaces facilitating self-orienting particles to preferential positions. The combination of features facilitate a resilient abrasive particle that can readily be incorporated into a wide variety of abrasive articles, including coated abrasive articles and/or bonded abrasive articles. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A method of forming an abrasive article comprising:
providing a mixture on a substrate; texturing a first major surface and a second major surface opposite the first major surface of the mixture to form a textured preform, wherein texturing comprises imparting at least one recessed-protrusion surface feature;
treating the textured preform; and
forming an abrasive particle having a first major surface comprising a first texture and a second major surface comprising a second texture.

2. The method of claim 1, wherein texturing comprises contacting the first major surface of the mixture with a first texturing form.

3. The method of claim 1, wherein providing further comprises forming the mixture using a process selected from the group consisting of casting, tape casting, printing, molding, extruding, sectioning, pressing, and a combination thereof.

4. The method of claim 3, wherein providing comprises printing the mixture into an opening of a screen.

5. The method of claim 4, wherein the mixture in the opening contacts a surface of a belt underlying the screen, and wherein the belt comprises a texture, and further wherein at least a portion of the texture of the belt forms the at least one recessed-protrusion surface feature on the first major surface of the textured preform.

6. The method of claim 1, further comprising
removing the mixture from the substrate to form the abrasive particle.

7. The method of claim 6, wherein the substrate comprises a screen.

8. The method of claim 6, wherein removing comprises separating the substrate from an underlying belt.

9. The method of claim 1, wherein the at least one recessed-protrusion surface feature comprises a discrete recess and a protrusion contained entirely within the discrete recess.

10. The method of claim 9, wherein the discrete recess comprises a bottom surface and the protrusion extends away from the bottom surface, and wherein a boundary of the protrusion is spaced apart from an edge of the discrete recess defining the bottom surface.

11. The method of claim 9, wherein the protrusion has a length different than a length of the discrete recess.

12. The method of claim 11, wherein the length of the protrusion is not greater than about 95% of the length of the discrete recess.

13. The method of claim 9, wherein the protrusion has a width different than a width of the discrete recess.

14. The method of claim 9, wherein the protrusion has a height that is different than a depth of the discrete recess.

15. The method of claim 14, wherein the height of the protrusion is greater than the depth of the discrete recess.

16. The method of claim 9, wherein the discrete recess extends in a substantially linear direction along a first axis.

17. The method of claim 16, wherein the protrusion extends in a substantially linear direction along a second axis, and wherein the first axis is parallel to the second axis.

18. The method of claim 9, wherein the discrete recess has a two-dimensional shape defining three arms.

19. The method of claim 9, wherein the protrusion comprises an upper surface having a substantially triangular two-dimensional shape.

20. The method of claim 1, wherein treating further comprises subjecting the textured preform to a surface treatment process.

* * * * *